(12) United States Patent
Lamba et al.

(10) Patent No.: US 11,818,088 B2
(45) Date of Patent: *Nov. 14, 2023

(54) MESSAGING SYSTEM FOR REVIEW DATA

(71) Applicant: Snap Inc., Santa Monica, CA (US)

(72) Inventors: Hemank Lamba, Pittsburgh, PA (US);
Yvonna Xiang, Seattle, WA (US);
Ansgar Pfeifer, Berumbur (DE); David Futschik, Prague (CZ)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,404

(22) Filed: Nov. 30, 2022

(65) Prior Publication Data
US 2023/0090681 A1 Mar. 23, 2023

Related U.S. Application Data

(63) Continuation of application No. 16/192,352, filed on Nov. 15, 2018, now Pat. No. 11,570,133.

(51) Int. Cl.
| | |
|---|---|
| *H04L 51/222* | (2022.01) |
| *H04L 51/046* | (2022.01) |
| *H04W 4/021* | (2018.01) |
| *H04L 51/52* | (2022.01) |

(52) U.S. Cl.
CPC .......... *H04L 51/222* (2022.05); *H04L 51/046* (2013.01); *H04L 51/52* (2022.05); *H04W 4/021* (2013.01)

(58) Field of Classification Search
CPC ....... H04L 51/20; H04L 51/046; H04L 51/32; H04W 4/021
See application file for complete search history.

(56) References Cited

U.S. PATENT DOCUMENTS

| | | | | |
|---|---|---|---|---|
| 9,057,617 | B1 * | 6/2015 | Lopatenko | G01C 21/20 |
| 2009/0254840 | A1 * | 10/2009 | Churchill | H04L 51/04 |
| | | | | 715/753 |
| 2012/0246004 | A1 * | 9/2012 | Book | G06Q 30/02 |
| | | | | 705/347 |

(Continued)

OTHER PUBLICATIONS

"U.S. Appl. No. 16/192,352, 312 Amendment filed Filed Nov. 22, 2022", 9 pgs.

(Continued)

*Primary Examiner* — Kamal B Divecha
*Assistant Examiner* — Sujana Khakural
(74) *Attorney, Agent, or Firm* — Schwegman Lundberg & Woessner, P.A.

(57) ABSTRACT

A method to communicate a message, the method comprises storing geolocation information pertaining to a user device, the geolocation information identifying a geographic location. A message input request is received at a user device. The stored geolocation information is accessed. Based on the geolocation information, the user device is selectively enabled to generate message content associated with a point of interest, the selective enabling includes presenting a review annotation to the user on a user interface of the user device, the review annotation being modifiable by the user in order to generate the message content to include a modified review annotation.

20 Claims, 21 Drawing Sheets

(56) References Cited

U.S. PATENT DOCUMENTS

| | | | | |
|---|---|---|---|---|
| 2013/0225206 | A1* | 8/2013 | Shuman | H04L 67/56 |
| | | | | 455/456.3 |
| 2015/0006648 | A1 | 1/2015 | Cao | |
| 2015/0172393 | A1* | 6/2015 | Oplinger | H04L 67/52 |
| | | | | 709/204 |
| 2015/0181383 | A1 | 6/2015 | Schulz et al. | |
| 2015/0334117 | A1* | 11/2015 | Terleski | G06Q 10/10 |
| | | | | 726/27 |
| 2018/0241713 | A1* | 8/2018 | Subba | H04L 51/224 |
| 2018/0260791 | A1* | 9/2018 | Berchielli | G06Q 10/1095 |
| 2019/0019230 | A1 | 1/2019 | Constantinides | |
| 2019/0116473 | A1* | 4/2019 | Constantinides | H04W 4/185 |

OTHER PUBLICATIONS

"U.S. Appl. No. 16/192,352, Advisory Action dated Feb. 10, 2021", 4 pgs.

"U.S. Appl. No. 16/192,352, Examiner Interview Summary dated Jul. 14, 2020", 3 pgs.

"U.S. Appl. No. 16/192,352, Examiner Interview Summary dated Oct. 29, 2021".

"U.S. Appl. No. 16/192,352, Final Office Action dated Nov. 12, 2020", 23 pgs.

"U.S. Appl. No. 16/192,352, Final Office Action dated Dec. 29, 2021", 32 pgs.

"U.S. Appl. No. 16/192,352, Non Final Office Action dated Apr. 16, 2020", 19 pgs.

"U.S. Appl. No. 16/192,352, Non Final Office Action dated Jul. 26, 2021", 27 pgs.

"U.S. Appl. No. 16/192,352, Notice of Allowance dated Aug. 22, 2022", 20 pgs.

"U.S. Appl. No. 16/192,352, Response filed Jan. 20, 2021 to Final Office Action dated Nov. 12, 2020", 13 pgs.

"U.S. Appl. No. 16/192,352, Response filed Feb. 12, 2021 to Advisory Action dated Feb. 10, 2021", 15 pgs.

"U.S. Appl. No. 16/192,352, Response filed Mar. 29, 2022 to Final Office Action dated Dec. 29, 2021", 17 pgs.

"U.S. Appl. No. 16/192,352, Response filed Jul. 15, 2020 to Non Final Office Action dated Apr. 16, 2020", 12 pgs.

"U.S. Appl. No. 16/192,352, Response filed Oct. 26, 2021 to Non Final Office Action dated Jul. 26, 2021", 12 pgs.

"Barista Skills and Latte Art Techniques", Dritan Alsela, [Online] Retrieved from the Internet on Mar. 19, 2019: <URL: https://www.youtube.com/watch?v=4WUDjUZ9u-4>, (Nov. 4, 2013), 242 pgs; 2:03 min.

"Starbucks Is Misspelling Your Name On Purpose", Super Deluxe, [Online] Retrieved from the Internet on Mar. 18, 2019: <https://www.youtube.com/watch?v=kz57jDu9KUM>, (Dec. 9, 2016), 205 pgs; 1:49 min.

"Yelp", Wikipedia, [Online] Retrieved from the Internet: <URL: https://en.wikipedia.org/wiki/Yelp>, (accessed Nov. 2, 2018), 8 pgs.

Bergstrom, Brian, "How does yelp verify reviews? Answer", Quora, [Online] Retrieved from the Internet on Nov. 2, 2018: <URL: https://www.quora.com/How-does-yelp-verify-reviews>, (Jan. 28, 2016), 1 pg.

Fisher, Ben, "Fake Reviews: What's the Impact and How Can We Combat Them?", BrightLocal Blog, [Online] Retrieved from the Internet on Mar. 19, 2019: <URL: http://www.brightlocal.com/2018/06/28/fake-reviews-impact-and-how-to-combat/>, (Jun. 28, 2018), 10 pgs.

Gotter, Ana, "Instagram Stickers: The Underrated Feature That Can Take Your Stories Further", (Sep. 27, 2018), 31 pgs.

Hawkins, Joy, "Dear Google: 4 suggestions for fixing your massive problem with fake reviews", Search Engine Land, [Online] Retrieved from the Internet on Nov. 2, 2018: <URL: https://searchengineland.com/dear-google-4-suggestions-fixing-massive-problem-fake-reviews-276445>, (Jun. 15, 2017), 4 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Stillman, Jessica, "Here's How to Spot Fake Online Reviews With 90 Percent Accuracy, According to Science", Inc.com, [Online] Retrieved from the Internet on Nov. 2, 2018: <https://www.inc.com/jessica-stillman/heres-how-to-spot-fake-online-reviews-with-90-perc.html>, (Aug. 25, 2017), 5 pgs.

White, Martha, "6 Clues That an Online Review Might Be Fake", Money Magazine, [Online] Retrieved from the Internet on Nov. 2, 2018: <URL: http://time.com/money/4095258/fake-online-reviews-yelp-amazon-tripadvisor/>, (Nov. 3, 2015), 2 pgs.

\* cited by examiner

MESSAGING SYSTEM FOR REVIEW DATA

CROSS-REFERENCE TO RELATED APPLICATION

This application is a continuation of U.S. patent application Ser. No. 16/192,352, filed Nov. 15, 2018, which is incorporated by reference herein in its entirety.

BACKGROUND

Mobile computing applications implement computer-mediated technologies allowing for the creating and sharing of content that communicates information, ideas, career interests and other forms of expression via virtual communities and networks. Social media platforms use web-based technologies, desktop computers and mobile technologies (e.g., smartphones and tablet computers) to create highly interactive platforms through which individuals, communities, and organizations can share, co-create, discuss, and modify user-generated content or pre-made content posted online.

One type of information that may be shared via mobile computing applications is review and ranking information relating to a range of topics, items and locations. As this review and ranking information has become widely accessible on to users of mobile computing applications, consumers become increasingly reliant on this information for making choices regarding purchases of items and services, as well as visits to locations and points of interest (e.g., restaurants, hotels). This increasing availability and reliance has in turn prompted some questionable practices, particularly the emergence of "fake reviews", where business owners (e.g., restaurateur) may incentivize users how to provide fake, positive reviews in return for a specific reward or incentive. Similarly, competitors of a particular business may themselves, or incentivize others, to provide fake, negative reviews regarding particular business.

The surfacing of review and ranking information in a way that is conveniently inevitable and trustworthy also presents a number of challenges as such are of your ranking information becomes ubiquitous and source from an increasingly large number of users.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
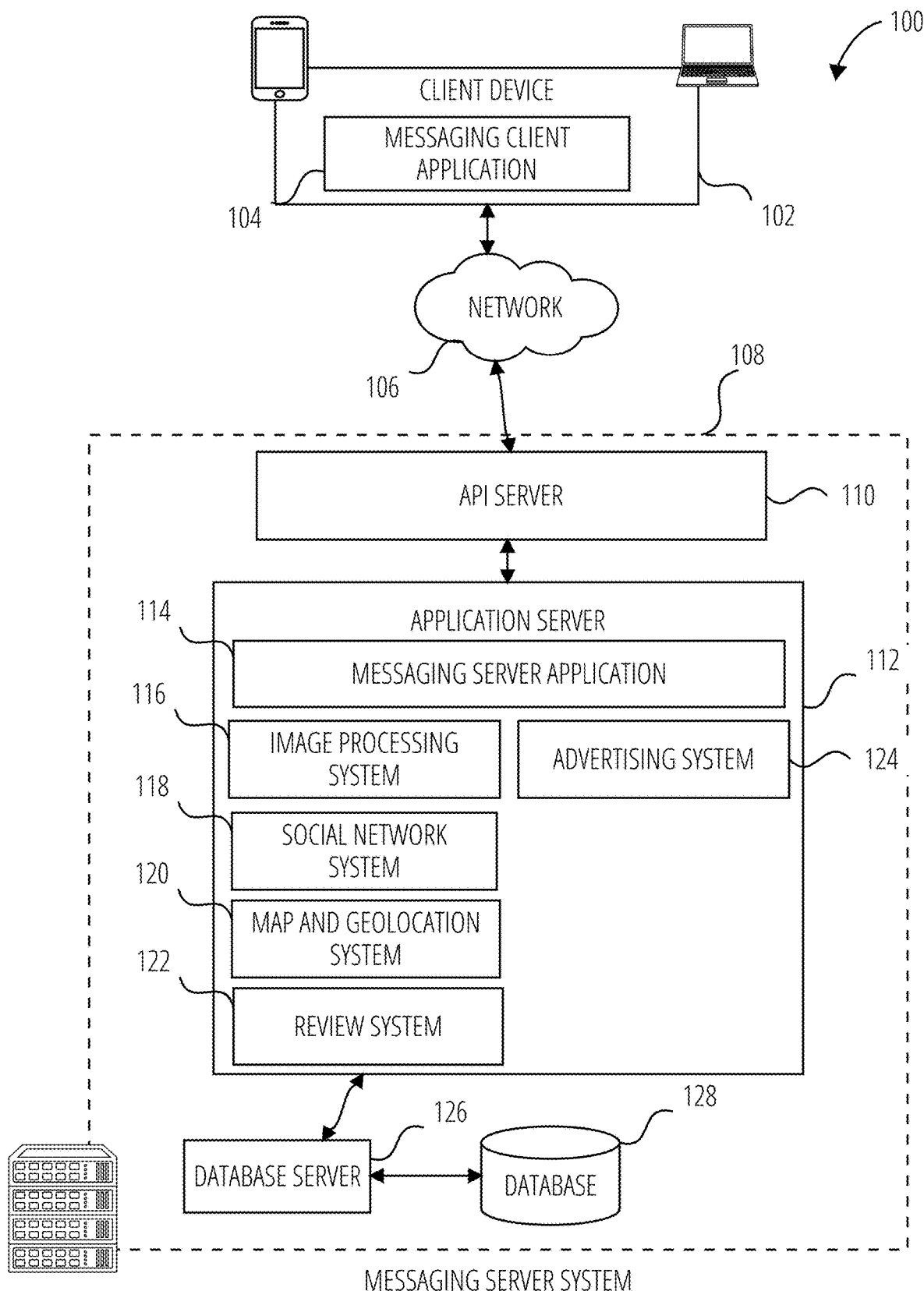
FIG. 1 is a block diagram showing an example messaging system for exchanging data (e.g., messages and associated content) over a network.

"Signal Medium" in this context refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" in this context refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" in this context refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" in this context refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" in this context refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Ephemeral Message" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

DESCRIPTION

This disclosure relates to methods and systems to communicate a message that includes a review annotation, or other ranking and review information, pertaining to a point of interest (POI). An example method includes storing geolocation information pertaining to a user device, the geolocation information identifying a geographic location. Responsive to message input request the received at a user device, the stored geolocation information is accessed. Based on the geolocation information, the method selectively enables the user to generate message content associated with a point of interest, the selective enabling includes presenting a review annotation (e.g., including review and ranking information) to the user on a user interface of the user device, the review annotation being modifiable (or selectable) by the user in order to generate the message content to include a modified review annotation.

The example method may further include determining, using the geolocation information, that the user device is currently within a determinable proximity of the point of interest, and based on the determination, selectively enabling the user to generate the message content associated with the point of interest. Alternatively, the example method may include determining, using the geolocation information, that the user device has been within a determinable proximity of the point of interest within a defined time period and, based on the determination, selectively enabling the user to generate the message content associated with the point of interest.

Accordingly, by performing an automated verification that a particular user, leaving review and ranking information, has physically visited or had some verifiable contact with a point of interest within a predetermined time interval, example embodiments seek to counter the occurrence of "fake reviews", wear users that have no contact with a point of interest (or other subject matter being reviewed) are deterred from generating and providing such review and ranking information.

Further, by providing the review and ranking information in the form of a modifiable or selectable the review annotation, the user experience presented via a user interface of a mobile computing application may be enhanced. For example, presenting an annotation in the form of a character avatar, a certain component of which can be selected or modified, in order to generate review information to be associated with the point of interest, substantially reduces the effort required by a user to leave visually interesting, meaningful and valuable review and ranking information.

This disclosure further relates to a map-based graphical user interface (map GUI) for a social media platform or application, in which review annotations (or other review or ranking information) is presented in conjunction with different types of social media sets of ephemeral content are represented at respective geographic locations (e.g., points of interests) on a map by visually distinct user-selectable user interface elements (further referred to as set icons or story icons). Such an interface is also referred to herein as a map GUI. Again, the presenting of review annotations (or other review and ranking information) on a map GUI is advantageous in that it facilitates easy identification and selection of such annotations by users of a mobile computing application.

Note that a set of social media items may be a collection of social media items that is represented as a unitary element, or is otherwise available for user- or operator-interaction as a unitary element.

In some embodiments, different types of set icons are distinguished by having user-selectable interface elements (e.g., a thumbnail) that are differently shaped or that are supplemented with additional information, such as review and ranking information. In one embodiment, for example, place icons that represent geo-anchored sets for an operator-defined geographic area comprise rectangular thumbnails, while spike icons for ad hoc or spike sets that represent relatively high-volume areas or relatively anomalous clusters of social media items comprise circular thumbnails.

In another example embodiment, different types of set icons are distinguished by text labels displayed in association with at least some of the types of set icons. For example, some types of set icons may in some embodiments be displayed with associated text labels (e.g., review and ranking information regarding a point of interest), while other types of set icons are unlabeled. In a particular example embodiment, icons for spike or ad hoc sets are unlabeled, while icons for one or more other types of sets (e.g., place sets and/or event sets) include a text label.

Differently defined, a method according to this aspect of the disclosure provides for rendering a plurality of set icons in a map GUI such that one or more visual attributes of at least some of the set icons are different depending on the set type of the corresponding social media set. In some embodiments, the different types of social media sets include geo-anchored sets associated with a particular fixed geographical feature or area (e.g., place sets/stories), and spike sets compiled ad hoc by a set management system based on one or more attributes of underlying social media activity (e.g., based on a quantified level of anomaly or unusualness of a corresponding geo-temporal cluster of social media items). "Anomaly" in this description means a measure that indicates how anomalous something is. Instead, or in addition, the different types of sets may include curated sets (whose social media items are curated by one or more human operators), and uncurated sets (in which social media items are compiled in a wholly automated procedure).

As will be described in greater detail below, ephemeral social media content comprises social media items that are available for viewing via the social media application for only a limited period. For example, an ephemeral message (also referred to herein as a snap) submitted by a user to the social media application may be available for viewing by other users via the map GUI of the social media application for only a predefined period subsequent to submission. In one example embodiment, each ephemeral message or snap has an availability lifetime (also referred to herein as a set participation timer) of 24 hours after submission, after which the ephemeral message "disappears" and is no longer available for viewing by other users via the map GUI. Such ephemeral messages typically comprise photographic or video content, which may be submitted with or without augmentations made by the user to the underlying photo or video content.

Ephemeral messages submitted by multiple different users may be available on a map forming part of the map GUI based at least in part on respective geo-tag information of the ephemeral messages. In some embodiments, the map GUI may provide location-based access to one or more collections or sets of ephemeral messages (also known as and referred to herein as a "stories"). In some example embodiments, a plurality of ephemeral messages submitted by different users are included in a common geo-anchored set or story based at least in part on respective geo-tagging information of the plurality of ephemeral messages. Such a location-based set or story is in some embodiments represented on the map GUI by a respective set icon displayed at a corresponding map location, the set icon being selectable by the user to trigger automated sequential display of the plurality of ephemeral messages in the set on the user device on which the map GUI is rendered. The set of icons may furthermore be personalized based on a social networking structure (e.g., as represented in an entity graph), so that the icons are only visible to a limited set of users of a social media platform (e.g., only users having a predetermined relationship as reflected in the entity graph with a particular viewing user).

In some embodiments, such a map GUI includes representations of at least approximate respective positions of a user's friends in a social network graph accessed by the social media application, with the social media application enabling the user to explore the world around friends' locations by use of the GUI. Thus, the map GUI can in some embodiments enable the user to explore uploaded social media content (e.g., individual photos or video clips/snaps, or social media sets such as stories comprising respective collections of photos, messages, or ranking and review information).

FIG. 1 is a block diagram showing an example messaging system 100 for exchanging data (e.g., messages and associated content) over a network. The messaging system 100 includes multiple client devices (e.g. such as the client device 102), each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between instances of the messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled, and provides a programmatic interface. to an application server 112. The application server 112 is communicatively coupled to a database server 126, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke the functionality of the application server 112. The Application Program Interface (API) server 110 exposes various functions supported by the application server 112, including for example:
  account registration,
  login functionality,
  the communication of messages and content, via the application server 112, between a particular messaging client application 104 to another messaging client application 104,
  the communication of media files (e.g., images or video) between a messaging client application 104 to the messaging server application 114, for possible access by another messaging client application 104,
  the sending and retrieval of a collection of media data (e.g., story),
  the communication of a list of friends of a user of a client device 102,
  the adding and deletion of friends to a social graph,
  the location of friends within a social graph, or
  the opening of an application event (e.g., relating to the messaging client application 104).

The application server 112 hosts a number of applications and subsystems, including a messaging server application 114, an image processing system 116, a social network system 118, a map and geolocation system 120, a review system 122 and an advertising system 124.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or sets). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 118 supports various social networking functions services and makes these functions and services available to the messaging server application 114. To this end, the social network system 118 maintains and accesses an entity graph 304 within the database 128. Examples of functions and services supported by the social network system 118 include the identification of other users of the messaging system 100 with which a particular user has relationships or is "following," and also the identification of other entities and interests of a particular user.

The map and geolocation system 120 receives geolocation data (e.g., GPS coordinates) associated with the content of messages communicated from a messaging client application 104, and perform various functions with respect to this geolocation information including storage thereof in the database 128. The map and geolocation system 120 may also provide other map and geolocation services to other components of the messaging system 100.

The map and geolocation system 120 may also generate map data representing the geography of a particular region, as well as the locations within that geography associated with user-generated content. In one example, the map data may include "heat map" representations of user-generated content density associated with geographic locations. This map data may be communicated to the messaging client application 104 for presentation to a user. The map data may also be supplemented with icons and other graphical symbols that allow user to explore and discover user-generated content within a geographic region. Further functionality provided by the map and geolocation system 120 includes enabling a user, via a messaging client application 104, to share his or her location with other users of the messaging system 100 in a controlled manner.

The review system 122 interacts with the messaging server application 114, and the messaging client application 104, to facilitate the user submission of review and rating data, and also to facilitate the presentation of this review and rating data to other users of the messaging system 100. To this end, the review system 122 communicates and accesses the map and geolocation system 120 and the social network system 118.

The advertising system 124 supports advertising functionality within the messaging system 100 and enables advertisers to create and manage advertisement campaigns. These advertising campaigns include images, videos, or annotations/overlays that are made present to users, and potentially made available to users to use in supplementing their own user-generated content.

The application server 112 is communicatively coupled to a database server 126, which facilitates access to a database 128 that stores data associated with messages processed by the messaging server application 114.

Figure 2:
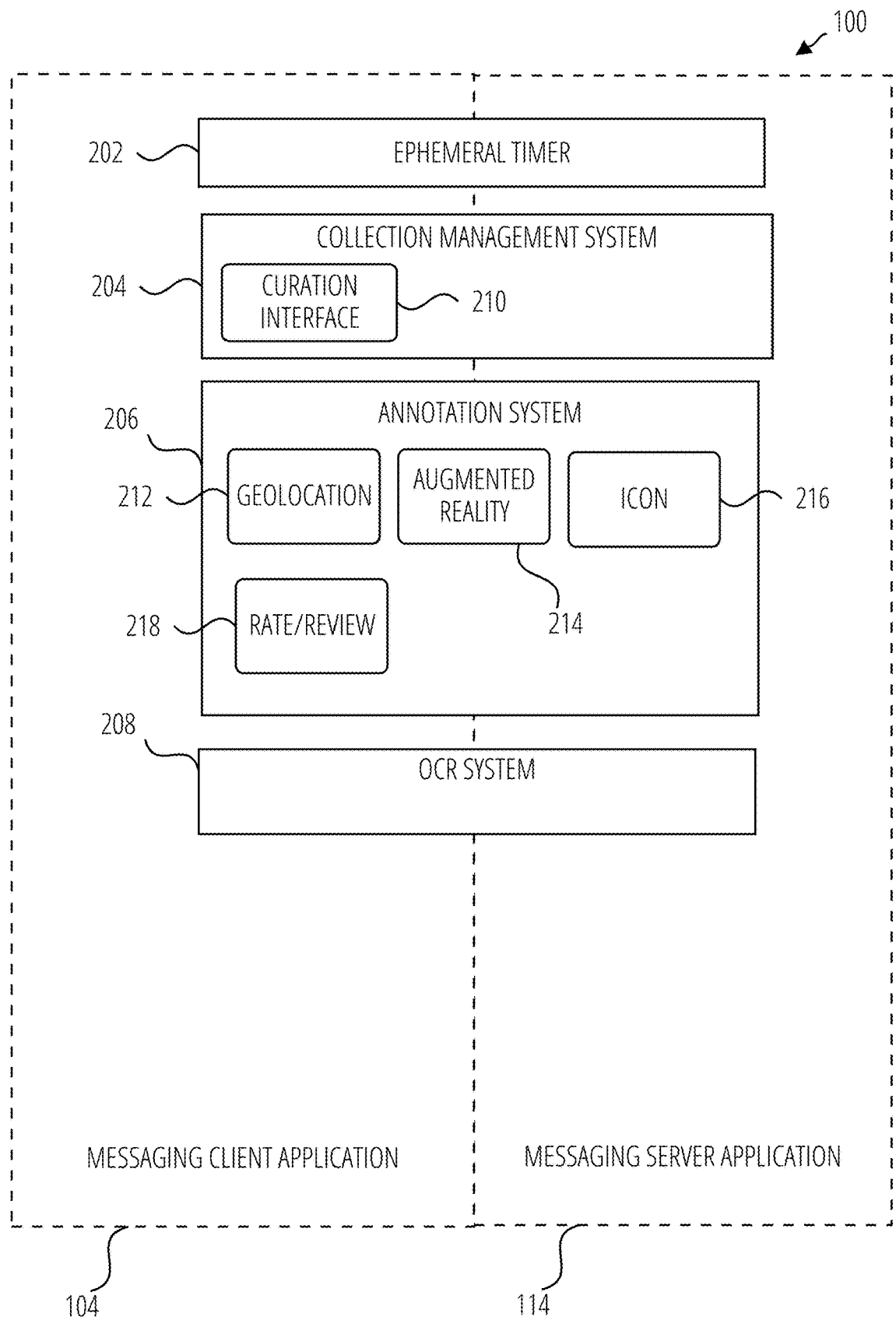
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer 202, a collection management system 204, an annotation system 206 and an optical character recognition (OCR) system 208.

The ephemeral timer 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a "story"), selectively display and enable access to messages and associated content via the messaging client application 104. Further details regarding the operation of the ephemeral timer system 202 are provided below.

The collection management system 204 is responsible for managing collections of media (e.g., collections of text, image video, and audio data). In some examples, a collection of content (e.g., messages, including images, video, text, and audio) may be organized into an "event set" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 210 that allows a collection manager to manage and curate a particular collection of content. For example, the curation interface 210 enables an event organizer to curate a collection of content relating to a specific event (e.g., delete inappropriate content or redundant messages). Additionally, the collection management system 204 employs machine vision (or image recognition technology) and content rules automatically to curate a content collection. In certain embodiments, compensation may be paid to a user for the inclusion of user-generated content (UGC) into a collection. In such cases, the curation interface 210 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter, effect, graphical icon, etc.) to the messaging client application 104, for example based on a geolocation of the client device 102. In another example, the annotation system 206 operatively supplies a media overlay to the messaging client application 104 based on other information, such as social network information of the user of the client device 102.

A media overlay may include audio and visual content, and/or visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated taken by the client device 102. In another example, the media overlay includes an identification of a location overlay (e.g., Venice beach), a name of a live event overlay, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant.

The media overlays further include "figures" or other icons that can be overlaid or superimposed upon a picture or other contract. One example of such an icon is a character icon or cartoon avatar, which may be personalized by a user to be representative of the user or express some characteristic or personality attribute of the user.

To this end, the annotation system 206 is shown to include a geolocation annotation subsystem 212 (provides geolocation-based media overlays), an augmented reality annotation subsystem 214 (provides augmented reality overlays, such as "filters"), an icon annotation subsystem 216 (provides icon overlays, such as cartoon avatars), and a rating/review annotation subsystem 218 (provides review and rating overlays).

The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

The optical character recognition (OCR) system 208 operatively recognizes barcodes or other optical, machine-readable representations of data to support various functions of the messaging system 100. For example, the optical character recognition (OCR) system 208 may enable a user to take a picture, using a client device 102, of a barcode presented on the screen of the client device 102, by the messaging client application 104, of a friend. The messaging system 100 (e.g., the messaging client application 104 and the messaging server application 114) may process the barcode information to identify the friend, and then interface with the social network system 118, so as to add the friend to a social network, as represented in the entity graph 304, of the user. The optical character recognition (OCR) system 208 may also be used to read other optical representations of data for other purposes, such as accessing network locations (e.g., URLs) or the intake of other information into the messaging client application 104.

Figure 3:
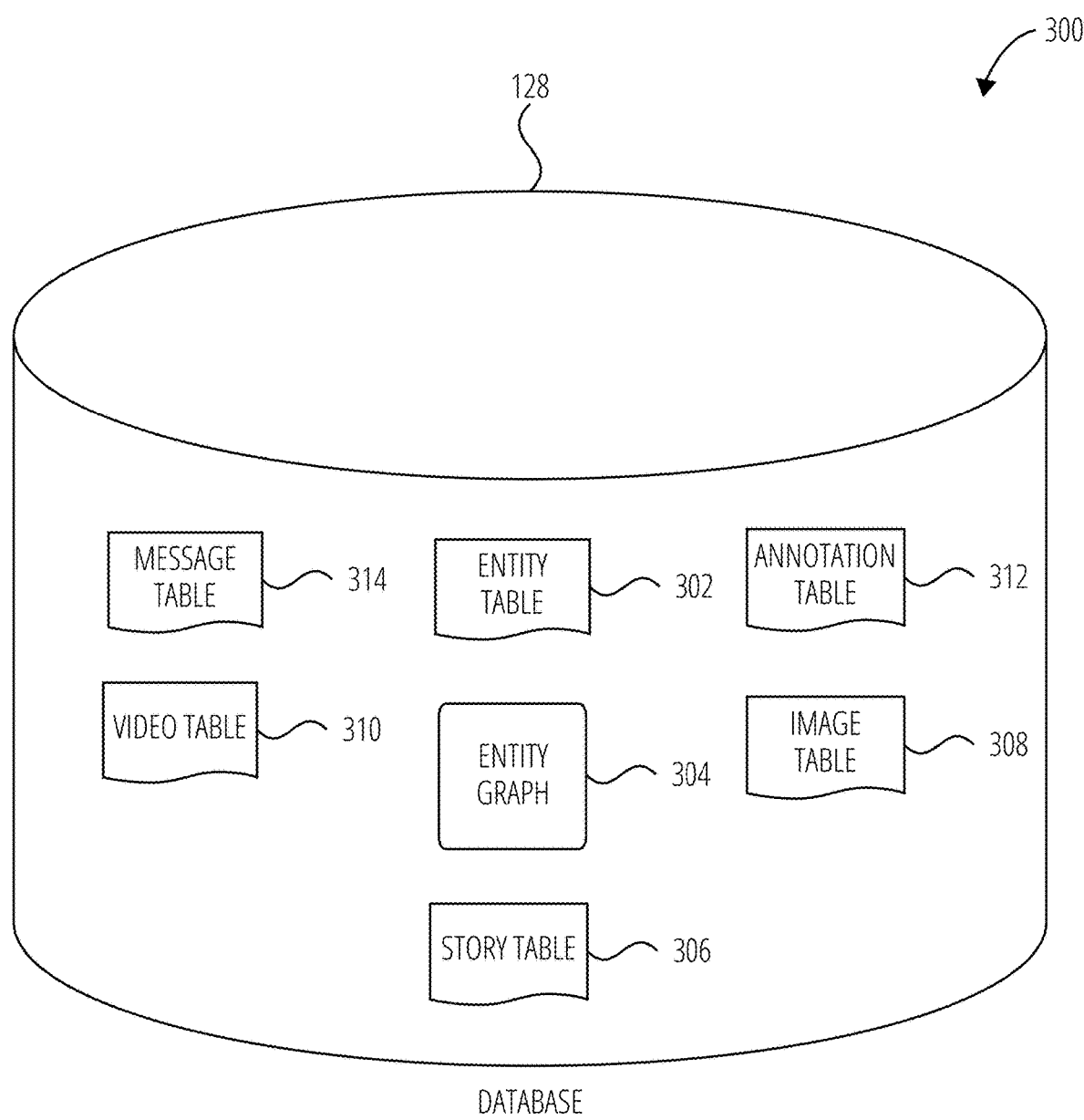
FIG. 3 is a schematic diagram illustrating data which may be stored in the database of the messaging server system, according to certain example embodiments.

FIG. 3 is a schematic diagram illustrating data 300 which may be stored in the database 128 of the messaging server system 108, according to certain example embodiments. While the content of the database 128 is shown to comprise a number of tables, it will be appreciated that the data could be stored in other types of data structures (e.g., as an object-oriented database).

The database 128 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 128 also stores annotation data, in the example form of overlays, filters and/or lenses, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, and a user may select a filter from a set of filters presented to a sending user by the messaging client application 104. Types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, battery life for a client device 102 or the current time.

Other annotation data that may be stored within the image table 308 is so-called "lens" data. A "lens" may be a real-time special effect, an augmented reality special effect, and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a "story" or a "set"). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
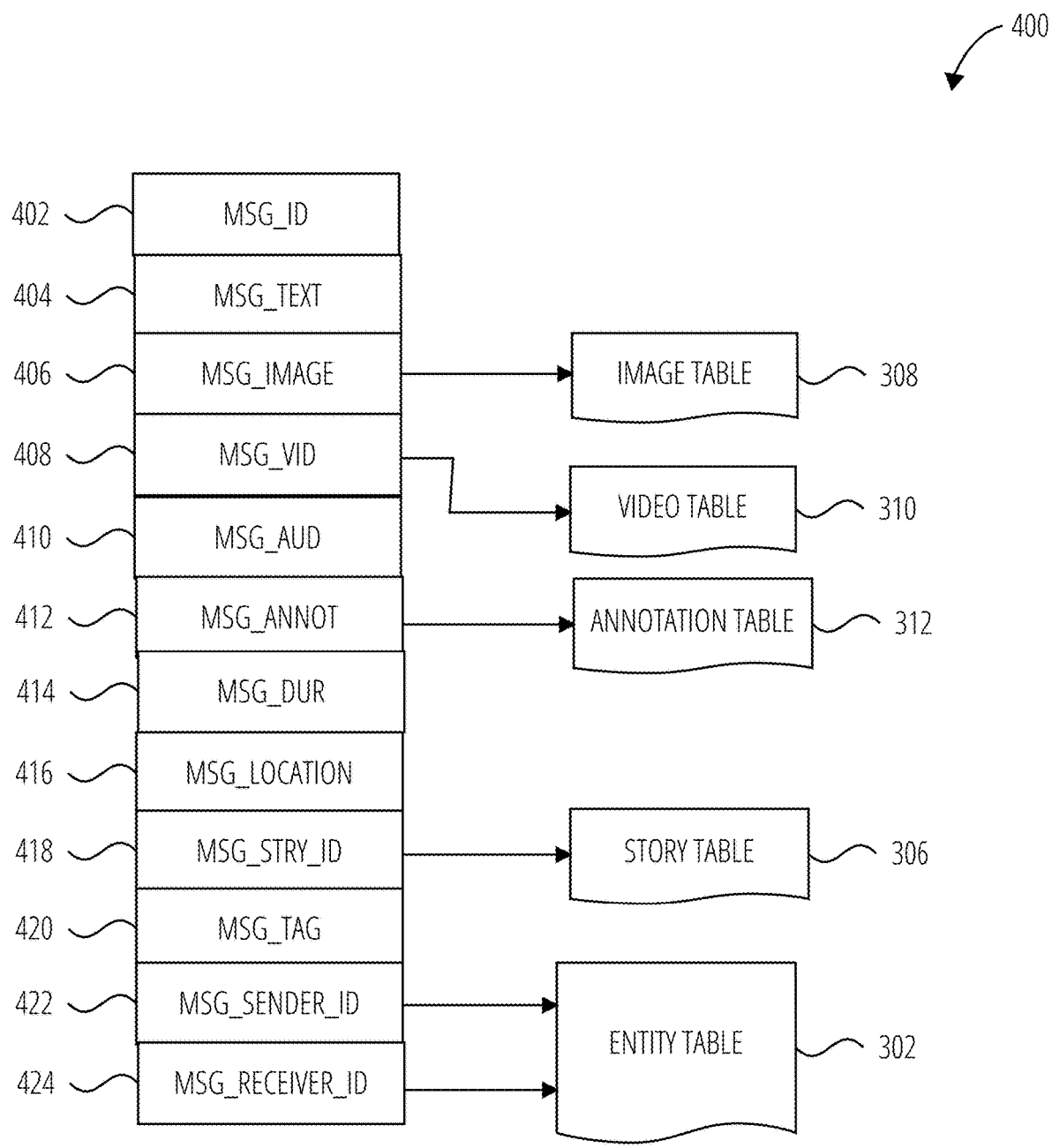
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400
- A message image payload 406: image data, captured by a camera component of a client device 102 or retrieved from the memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- Message annotations 412: annotation data (e.g., filters, stickers, cartoon avatars or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

- A message sender identifier 422: an identifier (e.g., a messaging system identifier, email address or device identifier) indicative of a user of the client device 102 on which the message 400 was generated and from which the message 400 was sent
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored in the message annotations 412 may point to data stored in an annotation table 312, values stored in the message story identifier 418 may point to data stored in a story table 306, and values stored in the message sender identifier 422 and the message receiver identifier 424 may point to user records stored in an entity table 302.

Figure 5:
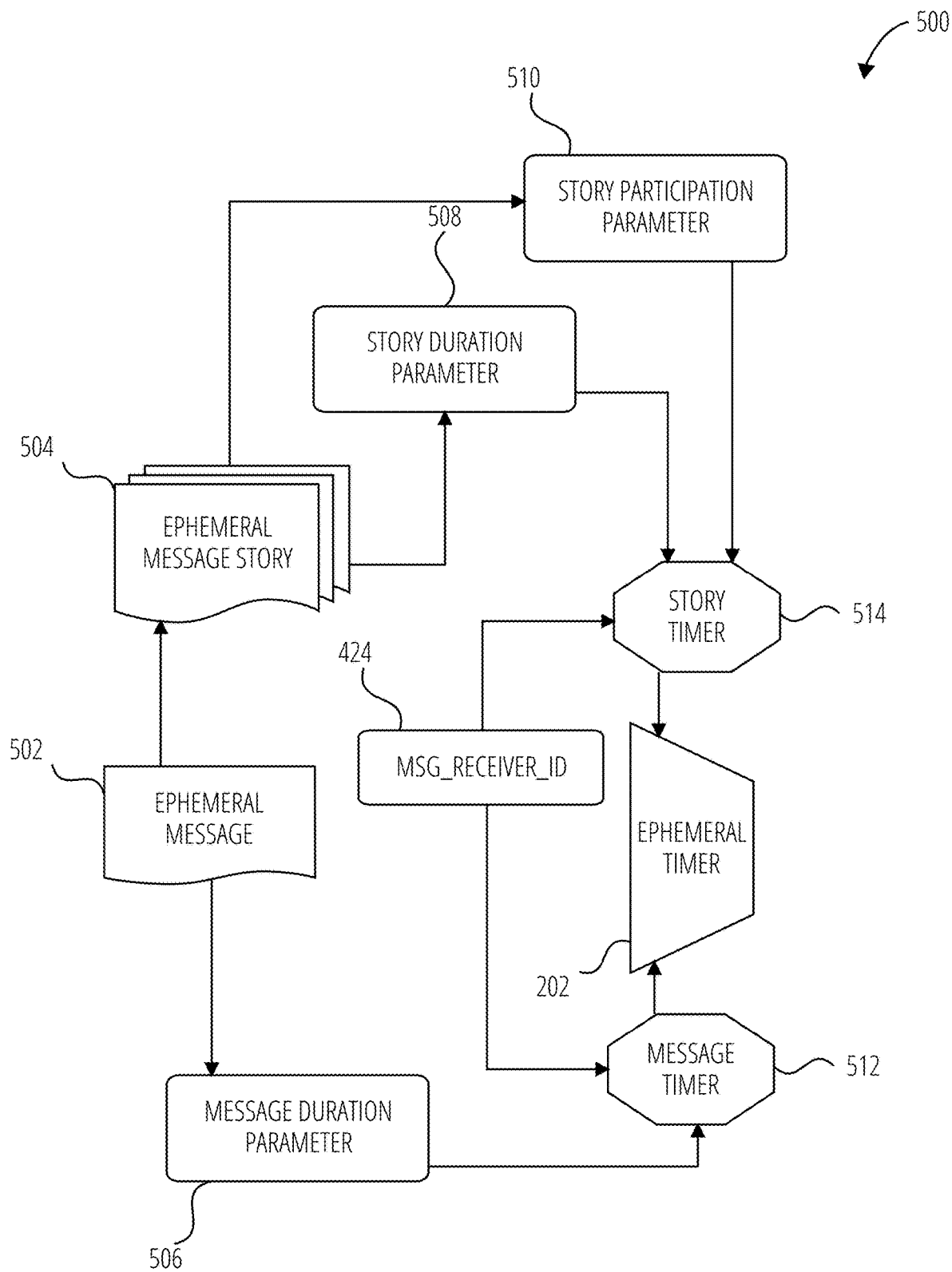
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum preset time (e.g., 10 seconds). A sending user may specify this preset time using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a preset time specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer 202 will remove the relevant ephemeral message 502 from the ephemeral message story 504 after the specified 24 hours. The ephemeral timer 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
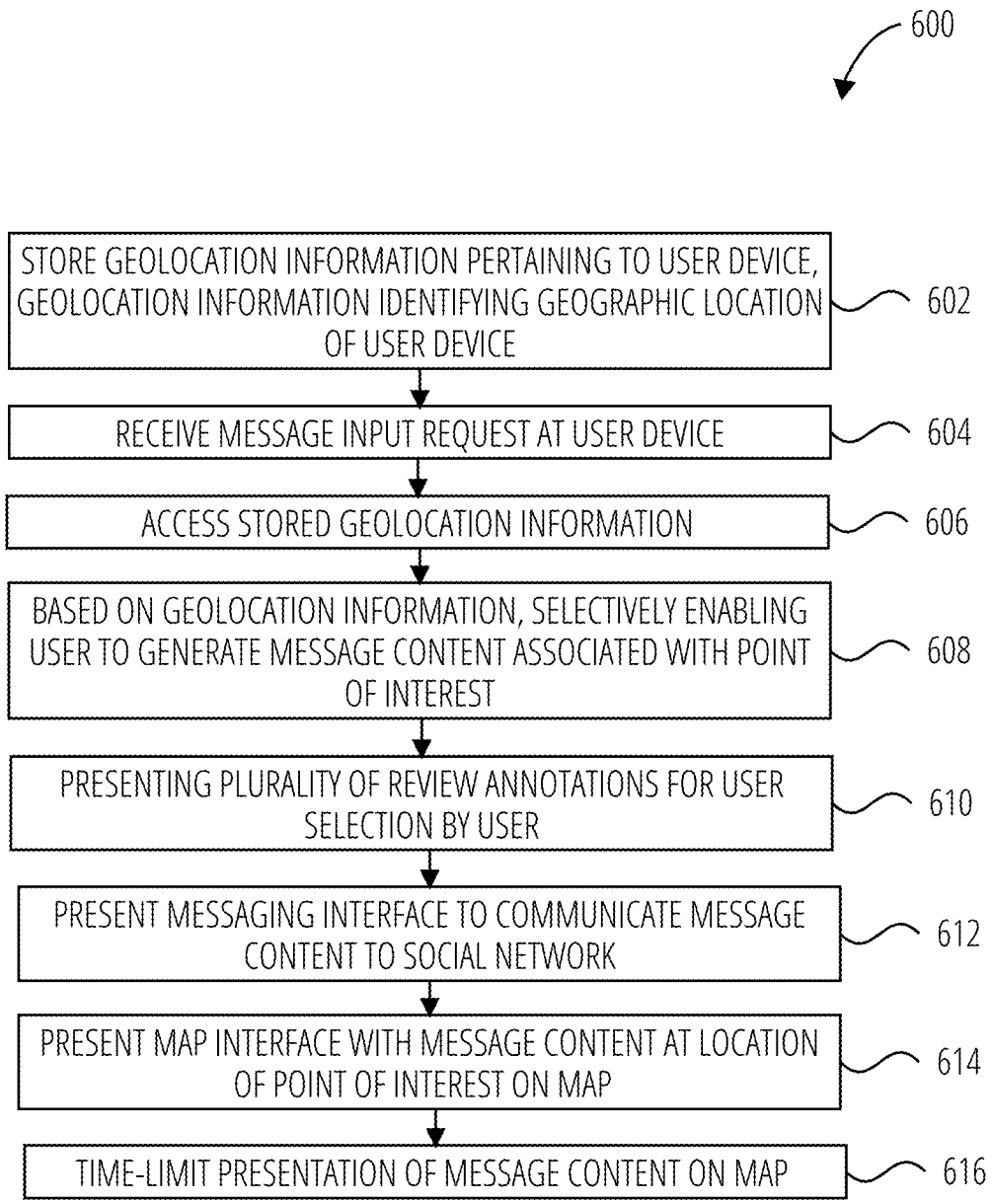
FIG. 6 illustrates a routine in accordance with one embodiment.

FIG. 6 is a flowchart illustrating a method 600, according to some example embodiments, to communicate the message content between users of a messaging system 100.

The method 600 commences at operation 602, with the storage of geolocation information (e.g., GPS coordinates) pertaining to a user device (e.g., client device 102), the geolocation information identifying a current geographic location of the client device 102. Where the client device 102 is, for example, a machine 2100, the position components 2138 determine the current GPS coordinates of the machine 2100, and stores this geolocation information within the memory 2104 of the machine 2100. The storage of the geolocation information may include associating the current location of the client device 102 with user-generated content (UGC), which is generated or captured using the client device 102. For example, where a photographic application or the messaging client application 104 is used to capture a photograph, the current geographic location may be associated with the photograph, and stored in the memory 2104 of the machine 2100 in association with the photograph (e.g., the photograph may be "geotagged"). Similarly, where video or audio data is captured by the client device 102, a current geographic location may be associated with this user-generated content.

At operation 604, a message input request is received at the user device. For example, a user may provide input to the messaging client application 104, executing on the client device 102, to request creation of a message, using the messaging client application 104, to be sent other users of the messaging system 100 via the messaging server system 108. The message input request, in one example embodiment, includes the identification of (1) a point of interest (e.g., through the selection of a filter, annotation, or image-overlay identifying the point of interest, or selection of a point of interest as presented on a map) and (2) user-generated content, such as a photograph, video or other image-based content, that the user wishes to communicate, using the messaging client application 10. The user-generated content may relate to the point of interest and may be a media item (e.g., a photograph or video of a particular location or an object physically located at that location, or audio data recorded at the particular location, etc.) The message input request also includes (3) a request to provide review or ranking information pertaining to the point of interest, as part of the message. The review or ranking information may pertain to the point of interest itself, or to a product or service offered by the point of interest (e.g., a meal or cocktail drink provided by a restaurant). Example embodiments of user interfaces to receive such message input requests are discussed in further detail below, with reference to a number of screenshots.

At operation 606, the stored geolocation information is accessed. In one example, the stored geolocation information may be accessed based on the user-generated content identified at operation 604. In this example, where the user selects a particular image or photograph to be included within the message, the associated geolocation information is accessed at operation 606. In another example, the messaging client application 104 may access the geolocation information, stored in the memory 2104, independently of any association with other content. Here, the messaging client application 104, executing on the client device 102, may query the memory 2104 with a predetermined frequency, or alternatively query the position components 2138 directly and with a predetermined frequency, in order to retrieve and access current or past geolocation information.

As operation 608, the messaging system 100 selectively enables a user to generate message content to be associated with a point of interest that is geographically identifiable. The selective enabling is performed based on a comparison of geolocation information associated with the point of interest and the geolocation information accessed at operation 606. This comparison ensures that a particular user is only able to generate message content (including, for example, rating and review information) with respect to a point of interest that has been visited by the user. Such as visit may be evidenced by a current location of a device associated with user or by content captured by the user within a determinable proximity to the point of interest.

The determination of the geolocation information associated with the point of interest is based on receiving, in one example embodiment, selection of an identifier related to the point of interest (e.g., a filter, image overlay or text overlay that identifies the point of interest) by the user. Using the selected identifier, the messaging client application 104 is able to determine the geolocation information of the point of interest. In another example embodiment, the point of interest may be selected from among multiple points of interest presented to the user on a map user interface.

The geolocation information accessed at operation 606 may, as noted above, be identified based on an association of the geolocation information with content (e.g., image content such as a photograph of video), which the user has selected for inclusion within the message. Consider that a user may have captured an image (e.g., photograph or video) relating to a point of interest (e.g., a photograph of the exterior of a restaurant, or of a meal served at a particular restaurant), which the user then identified at operation 604 during the message request input. The enabling of the generation of message content to be associated with that restaurant is performed based on a comparison of the geolocation information accessed at operation 606 and geolocation information associated with the image.

Enabling of the user to generate message content associated with the point of interest may be based on a determination, using the geolocation information accessed at operation 606, that the user device is currently within a determinable proximity (e.g., within a 200-yard radius) of the point of interest. In a further embodiment, the enabling may be based on a determination that the user device itself was within a determinable proximity of the point of interest within a defined time period (e.g., a preceding 24 hours or one week), or that content which the user has flagged for inclusion in the message was captured within the determinable proximity of the point of interest within the defined.

The method 600 includes, at operation 610, presenting a plurality of review annotations to the user for selection, the review annotations being presented on a user interface of the user device hosting the messaging client application 104. The review annotations, in one embodiment, are modifiable by the user in order to generate the message content. For example, the review annotation may include a number of numerical value on a scale of 1 to 5, the number being a user-selectable via an interface mechanism in order to modify the review annotation to reflect the selected number and accordingly the user's rating or ranking of a certain attribute or characteristic of the point of interest. Where the presenting of the review annotation includes presenting multiple review annotations for user selection, each of the multiple review annotations represents a specific and distinct review or ranking related to the point of interest. The review annotation may be a graphical character representation (e.g., a cartoon avatar) associated with the user in order to provide a degree of personalization with respect to the generated message content.

At operation 612, the method 600 includes presenting, using the messaging client application 104, a transmit function that includes an option to communicate the message content, via a social networking system, to an unrestricted group of users of the social networking system, or a restricted, subgroup of users of the social networking system. The subgroup of users may, for example, the users with which the sending user has a social relationship, as recorded within the entity graph 304 of the database 128.

At operation 614, the method 600 includes presenting the generated message content on a map interface of a messaging client application 104 to further users (e.g., a designated recipient). The generated message content is displayed on the map interface at a location on a map that is indicative of the point of interest. Accordingly, when a designated recipient (or receiving user) visits a geographic location (e.g., city), the messaging client application 104 of the designated recipient may display, on a map, generated content (including review and rating information) that was communicated from other users (e.g., a socially connected sender or friend).

At operation 616, the presentation of the generated message content on the map interface may be time-limited, and restricted after a determinable time interval after transmission or creation of the message content. For example, the presentation of the generated message content on the map interface may be time-limited to between two weeks and six months after generation of the message content, or after communication of the message content of operation 612. The ephemeral timer 202, discussed above with respect to FIG. 2 and FIG. 5 may be deployed in order to time-limit the presentation of the generated message content on the map interface of the messaging client application 104.

The above-described comparison of geolocation information for the point of interest with geolocation information associated with the message content provides a level of verification that a user that generated the message content, in fact, visited the point of interest, and guards against users providing review and/or rating comments with respect to the point of interest that they may not have visited. Also, the ability of users to limit their exposure to review and/or rating information, generated by only a certain subset of users (e.g., "friends") of a social networking system, is advantageous and increase the trust level that a particular user attributes to the review and/or ranking information. Further, the time limiting of the presentation of generated message content enhances its perceived value, in that a viewing user may be assured of the "freshness" or currency of the message content.

In certain embodiments, users are presented with modifiable time window parameter settings, in terms of which they may selectively determine the currency or time window of generated message content to be presented on the map interface. Accordingly, a user may elect to see the ranking and/or rating information posted within a selectable time period (e.g., two weeks-one year).

In a further embodiment, users may be presented with modifiable user parameter settings, in terms of which the user may select to see generated message content from an expanded or contracted group of users of the social networking system 100. For example, a particular user may elect to see review and/or ranking information from connections that are first-degree connections, second-degree connections, or even third-degree connections within the entity graph 304.

Figure 7:
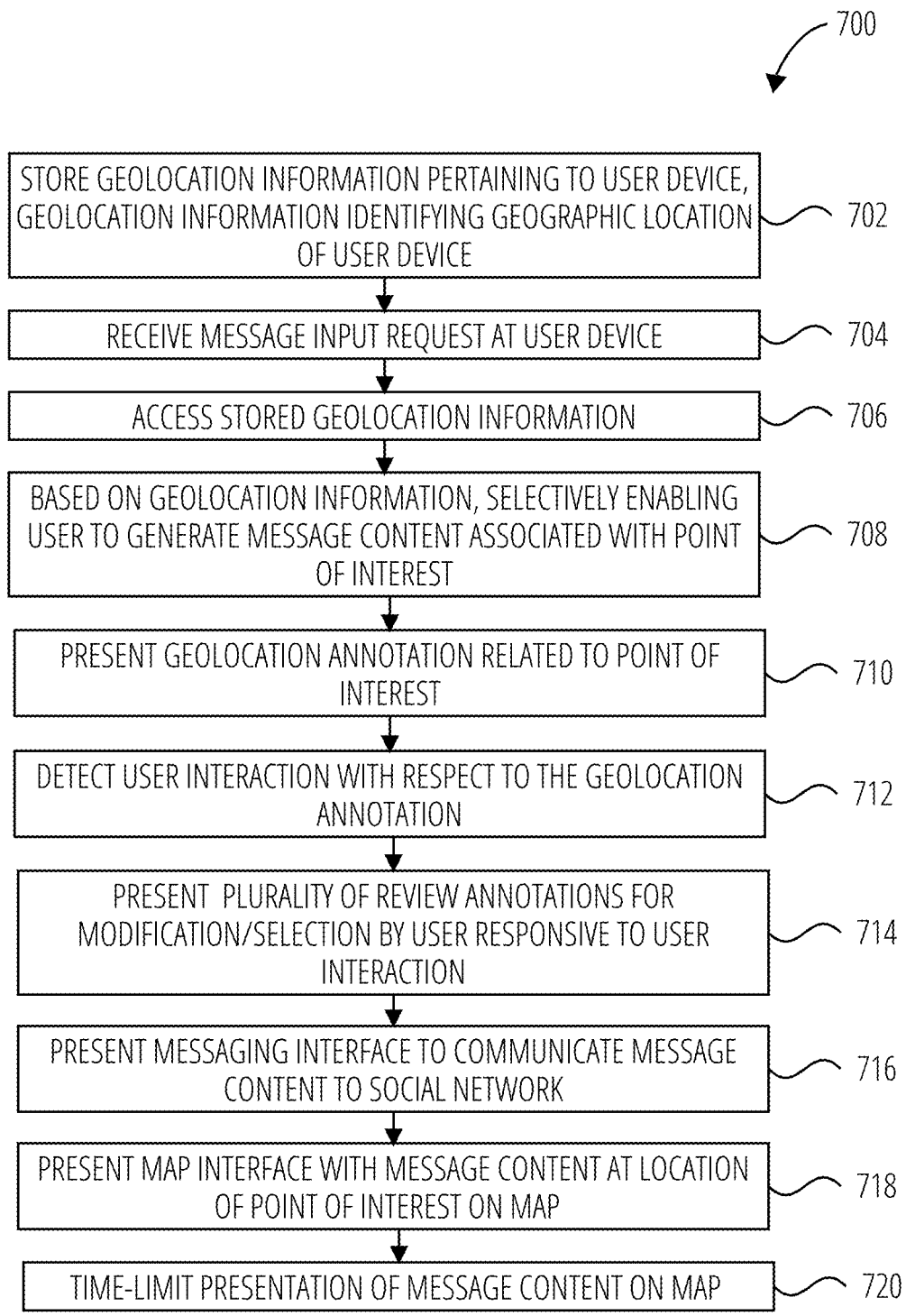
FIG. 7 illustrates a routine in accordance with one embodiment.

FIG. 7 is a flowchart illustrating a method 700, according to further example embodiments, to communicate the message content between users of a messaging system 100.

The method 700 commences at operation 702, with the storage of geolocation information (e.g., GPS coordinates) pertaining to a user device (e.g., client device 102), the geolocation information identifying a current geographic location of the client device 102. Where the client device 102 is, for example, a machine 2100, the position components 2138 determine the current GPS coordinates of the machine 2100, and stores this geolocation information within the memory 2104 of the machine 2100. The storage of the geolocation information may include associating the current location of the client device 102 with user generated content (UGC), which is generated or captured using the client device 102. For example, where a photographic application or the messaging client application 104 is used to capture a photograph, the current geographic location may be associated with the photograph, and stored in the memory 2104 of the machine 2100 in association with the photograph (e.g., the photograph may be "geotagged"). Similarly, where video or audio data is captured by the client device 102, a current geographic location may be associated with this user-generated content.

At operation 704, a message input request is received at the user device. For example, a user may provide input to the messaging client application 104, executing on the client device 102, to request the creation of a message, using the messaging client application 104, to be sent other users of the messaging system 100 via the messaging server system 108. The message input request, in one example embodiment, may be triggered by the taking or selecting of a photograph or video to communicate the message. The message input request may specifically include the identification of (1) a point of interest (e.g., through the selection of a filter, annotation, or image-overlay identifying the point of interest, or selection of a point of interest as presented on a map) and (2) user-generated content, such as a photograph, video or other image-based content, that the user wishes to communicate, using the messaging client application 104. The user-generated content may relate to the point of interest and may be a media item (e.g., a photograph or video of a particular location or an object physically located at that location, or audio data recorded at the particular location, etc.) The message input request may also include (3) a request to provide review and/or ranking information pertaining to the point of interest, as part of the message. The review or ranking information may pertain to the point of interest itself, or to a product or service offered by the point of interest (e.g., a meal or cocktail drink provided by a restaurant). Example embodiments of user interfaces to receive such message input requests are discussed in further detail below, with reference to a number of screenshots. The request to provide the review and/or ranking information does not have to form part of the initial message input request but may, as will be described below with respect operation 712, the presented user selection of a location annotation At operation 706, the stored geolocation information is accessed. In one example, the stored geolocation information may be accessed based on the user generated content identified at operation 704. In this example, where the user selects a particular image or photograph to be included within the message, the associated geolocation information (e.g., geo-tag associated with a photograph) is accessed at operation 706. In another example, the messaging client application 104 may access the geolocation information, stored in the memory 2104, independently of any association with other content. Here, the messaging client application 104, executing on the client device 102, may query the memory 2104 with a predetermined frequency, or alternatively query the position components 2138 directly and with a predetermined frequency, in order to retrieve and access current or past geolocation information.

As operation 708, the messaging system 100 selectively enables a user to generate message content to be associated with a point of interest that is geographically identifiable. The selective enabling is performed based on a comparison of geolocation information associated with the point of interest and the geolocation information accessed at operation 706. This comparison ensures that a particular user is only able to generate message content (including, for example review and/or rating information) with respect to a point of interest that has been visited by the user. Such as visit may be evidenced by a current location of a device associated with user or by content captured by the user within a determinable proximity to the point of interest. For example, the client messaging application 104 determines that a particular photograph was taken at a particular point of interest (e.g., a restaurant) and, via a user interface presented the user of the messaging client application 104, present the user with the option of creating a message, including ranking and review information and/or a further photograph), to be associated with the particular photograph taken at the point of interest.

The determination of the geolocation information associated with the point of interest is based on receiving, in one example embodiment, selection of an identifier related to the point of interest (e.g., a geolocation annotation, a filter, image overlay or text overlay that identifies the point of interest) by the user. Using the selected identifier, the messaging client application 104 is able to determine the geolocation information of the point of interest. In another example embodiment, the point of interest may be selected from among multiple point of interest presented to the user on a map user interface.

The geolocation information accessed at operation 706 may, as noted above, be identified based on an association of the geolocation information with content (e.g., image content such as a photograph of video), which the user has selected for inclusion within the message. Consider that a user may have captured an image (e.g., photograph or video) relating to a point of interest (e.g., a photograph of the exterior of a restaurant, or of a meal served at a particular restaurant), which the user then identified at operation 704 during the message request input. The enabling of the generation of message content to be associated with that restaurant is performed based on a comparison of the geolocation information accessed at operation 706 and geolocation information associated with the image.

Enabling of the user to generate message content associated with the point of interest may be based on a determination, using the geolocation information accessed at operation 706, that the user device is currently within a determinable proximity (e.g., within a 200-yard radius) of the point of interest. In a further embodiment, the enabling may be based on a determination that the user device itself was within a determinable proximity of the point of interest within a defined time period (e.g., a preceding 24 hours or one week), or that content which the user has flagged for inclusion in the message was captured within the determinable proximity of the point of interest within the defined.

At operation 710, the messaging client application 104 presents one or more geolocation annotations within a user interface selection, and association with the user-generated content. For example, a geolocation annotation, identifying a restaurant at which a photograph of a plate of food was taken, may be presented for user selection at operation 710. Responsive to user selection one of a series of presented geolocation annotations, the geolocation annotation associated with an image, for example. The geolocation annotation may furthermore be presented as an overlay on such an image, together with a user interface mechanism inviting user to provide a review related to the image, such as a review of point of interest (e.g., restaurant) at which the image was captured for the subject matter of the image (e.g., a particular meal served by the relevant restaurant).

At operation 712, the messaging client application detects user interaction with the geolocation annotation (or the associated review invitation mechanism), responsive to which, at operation 714, multiple review annotations are presented for selection and/or modification by the user. the multiple review annotations are, in one example embodiment, each selectable and/or modifiable by the user in order to generate the message content. For example, the review annotation may include a number of numerical values on a scale of 1 to 5, the number being a user-selectable via an interface mechanism in order to modify the review annotation to reflect the selected number and accordingly the user's rating or ranking of a certain attribute or characteristic of the point of interest. Where multiple review annotations are presented for user selection, each of the multiple review annotations represents a specific and distinct review or ranking related to the point of interest. The review annotation may be a graphical character representation (e.g., a cartoon avatar) associated with the user in order to provide a degree of personalization with respect to the generated message content.

At operation 716, the method 700 includes presenting, using the messaging client application 104, a transmit function that includes an option to communicate the message content, via a social networking system, to an unrestricted group of users of the social networking system, or a restricted, subgroup of users of the social networking system. The subgroup of users may, for example, the users with which the sending user has a social relationship, as recorded within the entity graph 304 of the database 128.

At operation 718, the method 700 includes presenting the generated message content on a map interface of a messaging client application 104 to further users (e.g., a designated recipient). The generated message content is displayed on the map interface at a location on a map that is indicative of the point of interest. Accordingly, when a designated recipient (or receiving user) visits a geographic location (e.g., city), the messaging client application 104 of the designated recipient may display, on a map, generated content (including review and rating information) that was communicated from other users (e.g., a socially connected sender or friend).

At operation 720, the presentation of the generated message content on the map interface may be time-limited, and restricted after a determinable time interval after transmission or creation of the message content. For example, the presentation of the generated message content on the map interface may be time-limited to between two weeks and six months after generation of the message content, or after communication of the message content of operation 712. The ephemeral timer 202, discussed above with respect to FIG. 2 and FIG. 5 may be deployed in order to time-limit the presentation of the generated message content on the map interface of the messaging client application 104.

FIG. 8-FIG. 18 are screenshots illustrating examples of user interfaces that may be generated and presented by a messaging client application 104, during the performance of the method 700 by the messaging system 100.

Figure 8:
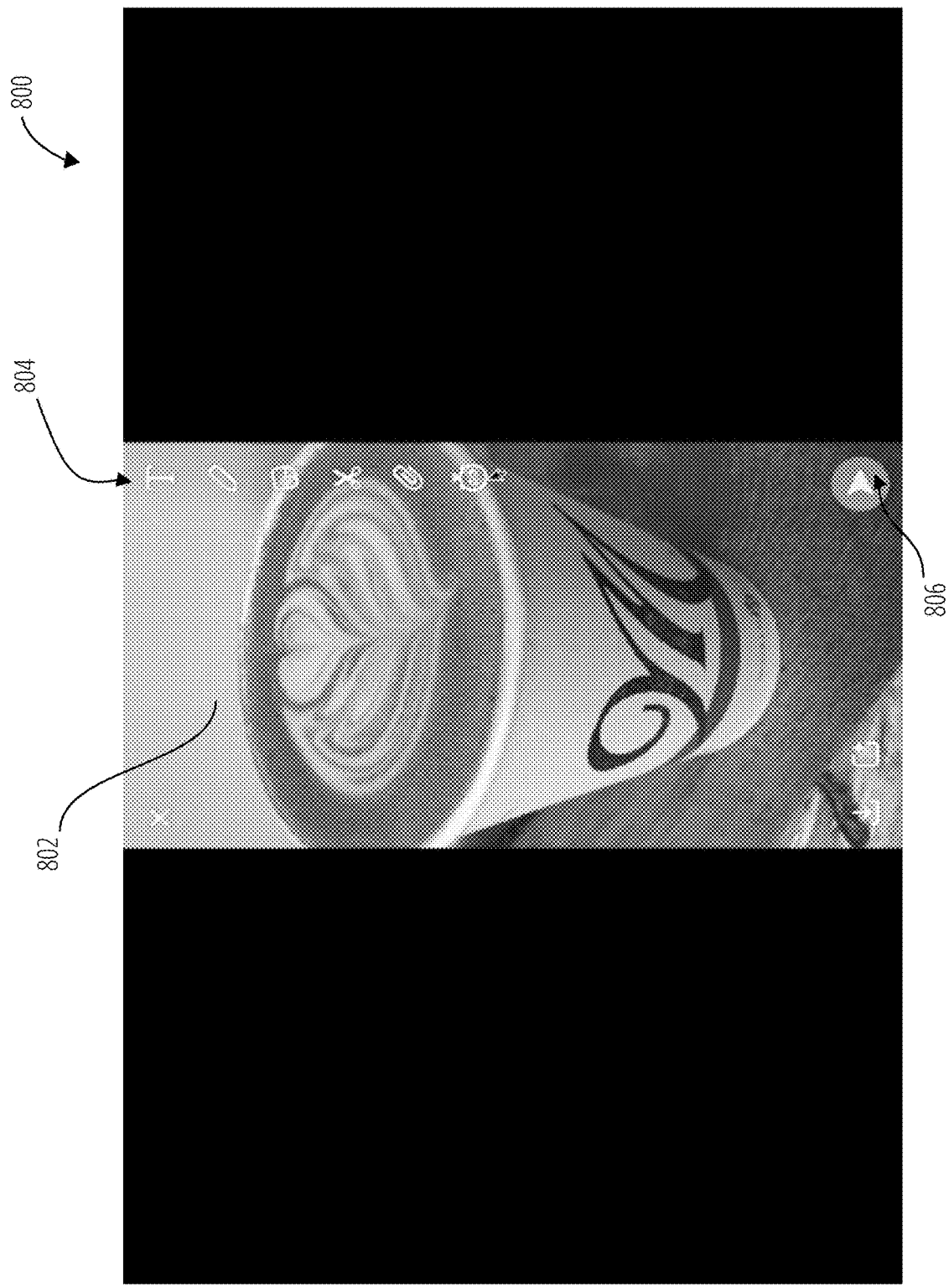
FIG. 8 illustrates a user interface 800 in accordance with one embodiment.

FIG. 8 is a screenshot of a first message generation user interface 800, of the messaging client application 104, within which is a user-generated content in the form of image 802 is displayed for potential inclusion within generated message content. The user interface 800 includes a collection of function icons 804, which are user selectable in order to modify the image 802 in various ways, as well as a message send icon 806 that it is selectable to initiate communication of generated message content to other users of the messaging system 100.

In addition to the function supported by the various function icons 804, the user interface 800 also, in an example embodiment, enables a user to add geolocation specific filters or overlays to the image 802 by performing other inputs or gestures with respect to the user interface 800. For example, a right swipe of the user interface 800 may present a specific geolocation overlay or annotation (e.g., a geofilter) that that represents location information (e.g., the name of a country, city, or point of interest such as a restaurant), in the proximity of location at which the image 802 is captured.

Figure 9:
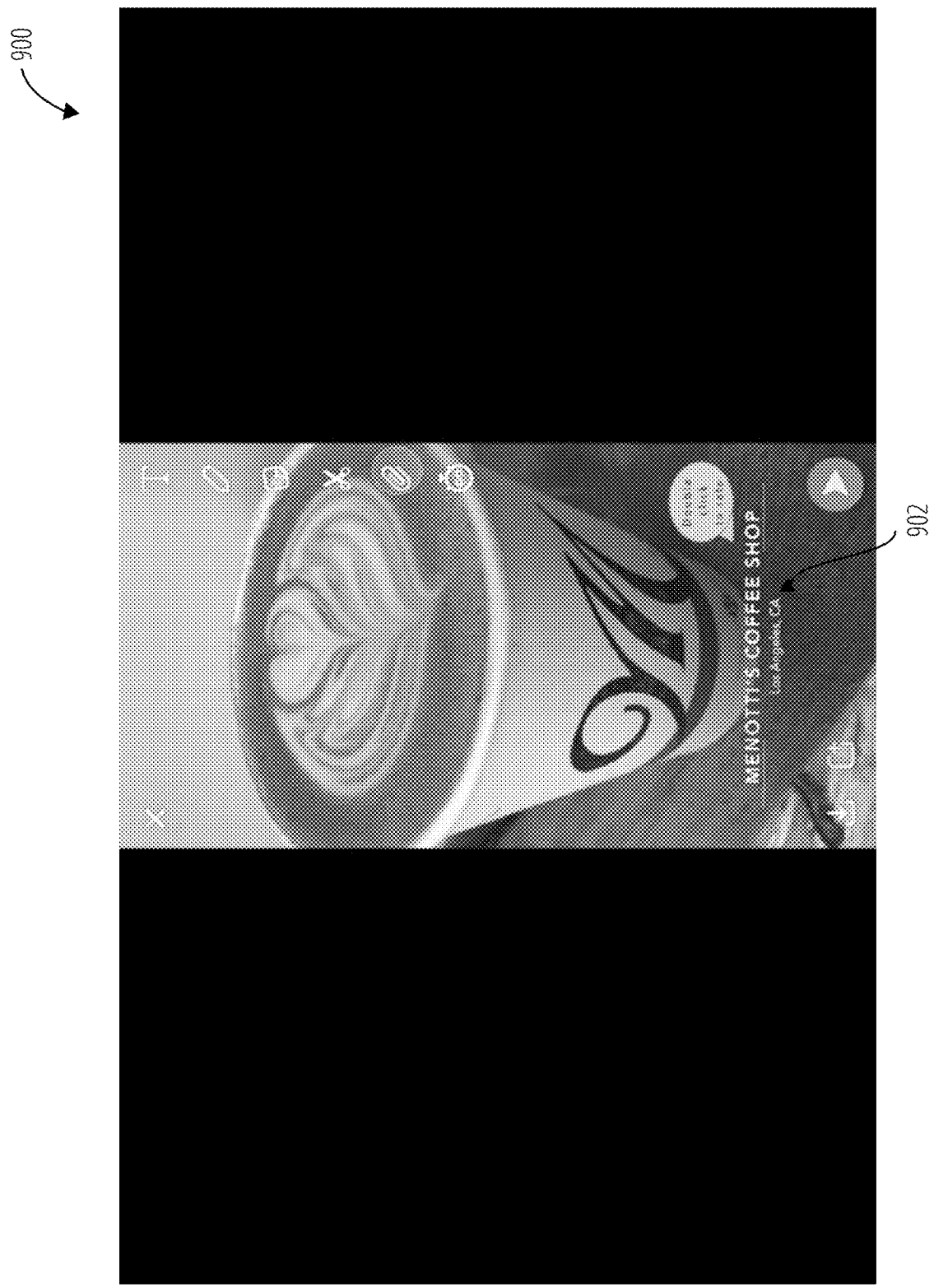
FIG. 9 illustrates a user interface 900 in accordance with one embodiment.

FIG. 9 is a screenshot of a further message generation user interface 900, showing an example of a geolocation annotation 902 that may be presented on the user interface 900 responsive to a right swipe on the user interface 800. The example annotation 902 identifies that the picture of the coffee mug was taken at "Menotti's Coffee Shop" in Los Angeles. The example geolocation annotation 902 furthermore includes functionality that enables user to activate review functionality provided by the messaging client application 104. As shown in FIG. 9, the annotation 902 is accompanied by a "voice bubble" or other user interface information, inviting a user to double-click on the annotation 902 in order to provide review and/or information, in the form of a review annotation.

Figure 10:
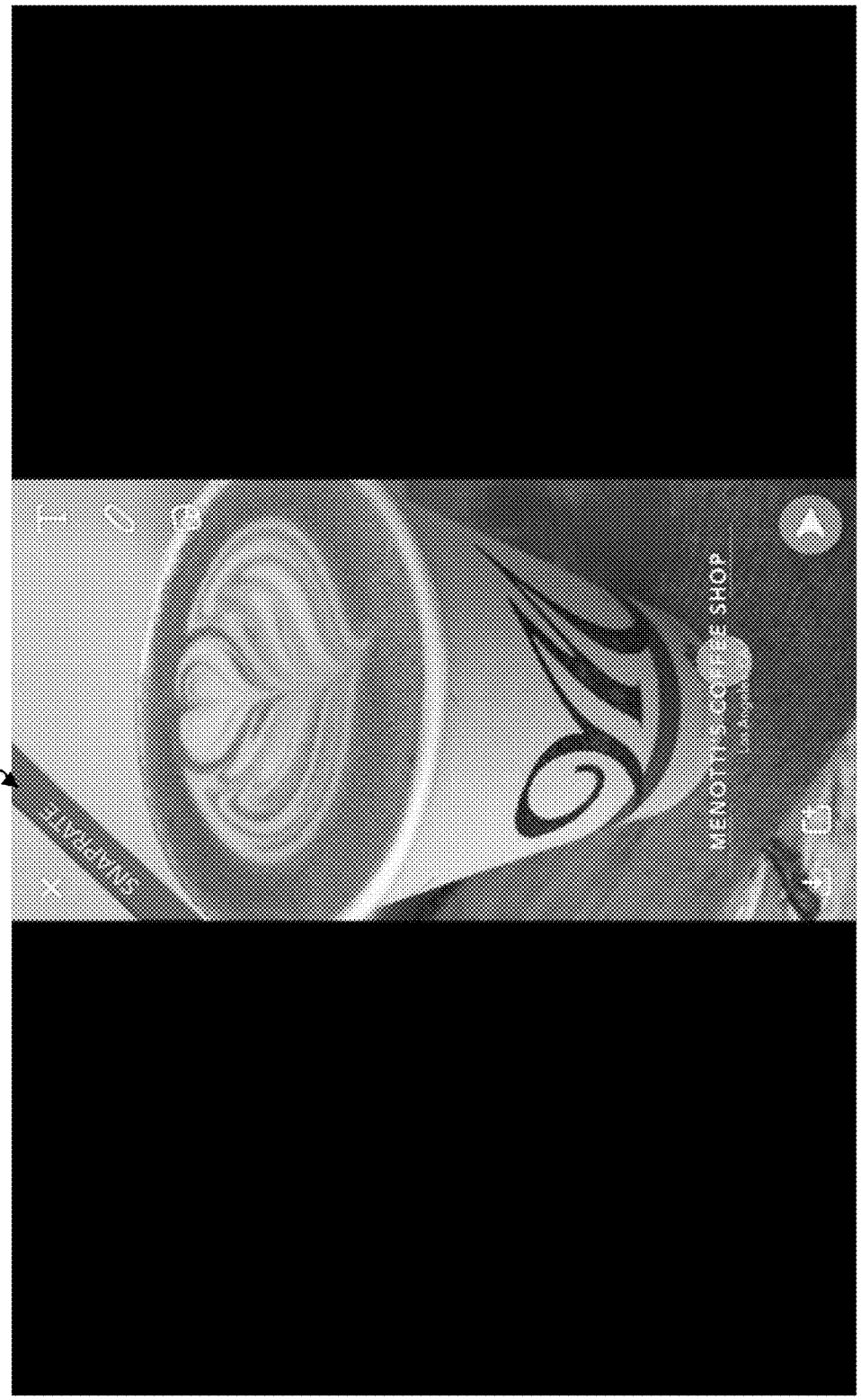
FIG. 10 illustrates a user interface 1000 in accordance with one embodiment.

FIG. 10 is a screenshot of message generation user interface 1000 showing an example of a review indication 1002 which may be presented responsive to user selection of geolocation annotation 902. The review indication 1002 communicates to the user that review functionality provided by the messaging client application 104 has been activated.

Figure 11:
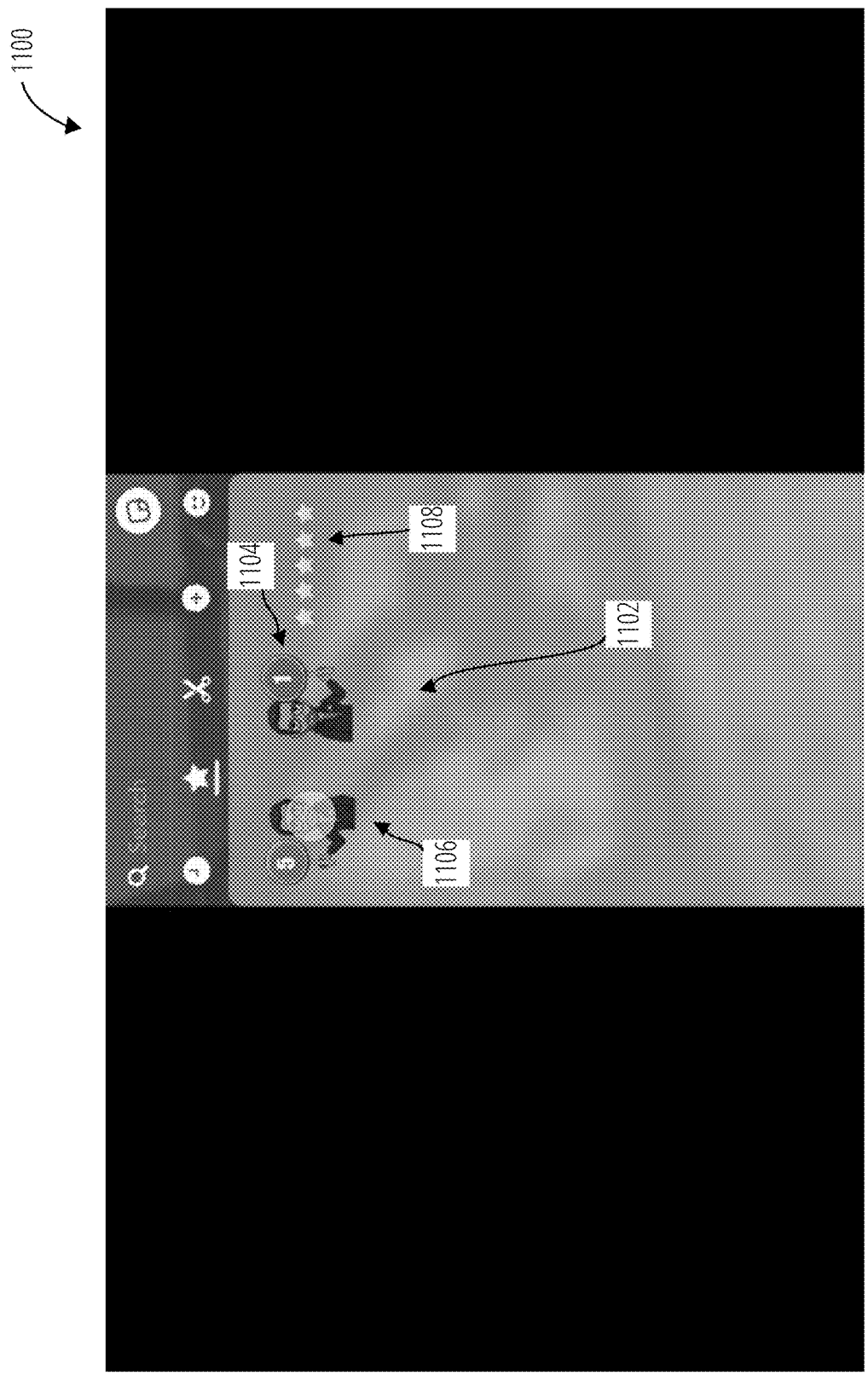
FIG. 11 illustrates a user interface 1100 in accordance with one embodiment.

FIG. 11 is a screenshot of a review user interface 1100, according to an example embodiment, that is presented subsequent to the user interface 1000 shown FIG. 10. The review user interface 1100 presents a number of review annotations 1102, each including different review information and being selectable by the user in order to generate message content in the form of a review annotation that can be overlaid on the image 802. Specifically, the example review annotations 1102 comprise a series of graphical character representations (e.g., cartoon avatars) that are associated with and represent a user of messaging client application 104. Each of the review annotations 1102 includes different review or ranking information. For example, the review annotation 1104 indicates a review or ranking of "1" on a scale of 1 to 5, while the review annotation 1106 indicates a review or ranking of "5" on the scale of 1 to 5. In the example, the review user interface 1100 presents a series of review stars 1108, with the user being able to select a number of stars between 1-5 to trigger generation of a character representation review annotation indicating the number of selected stars. For example, should three stars be selected from the review stars 1108, the messaging client application 104 operates to generate a cartoon avatar holding up a paddle bearing the number "3".

Figure 12:
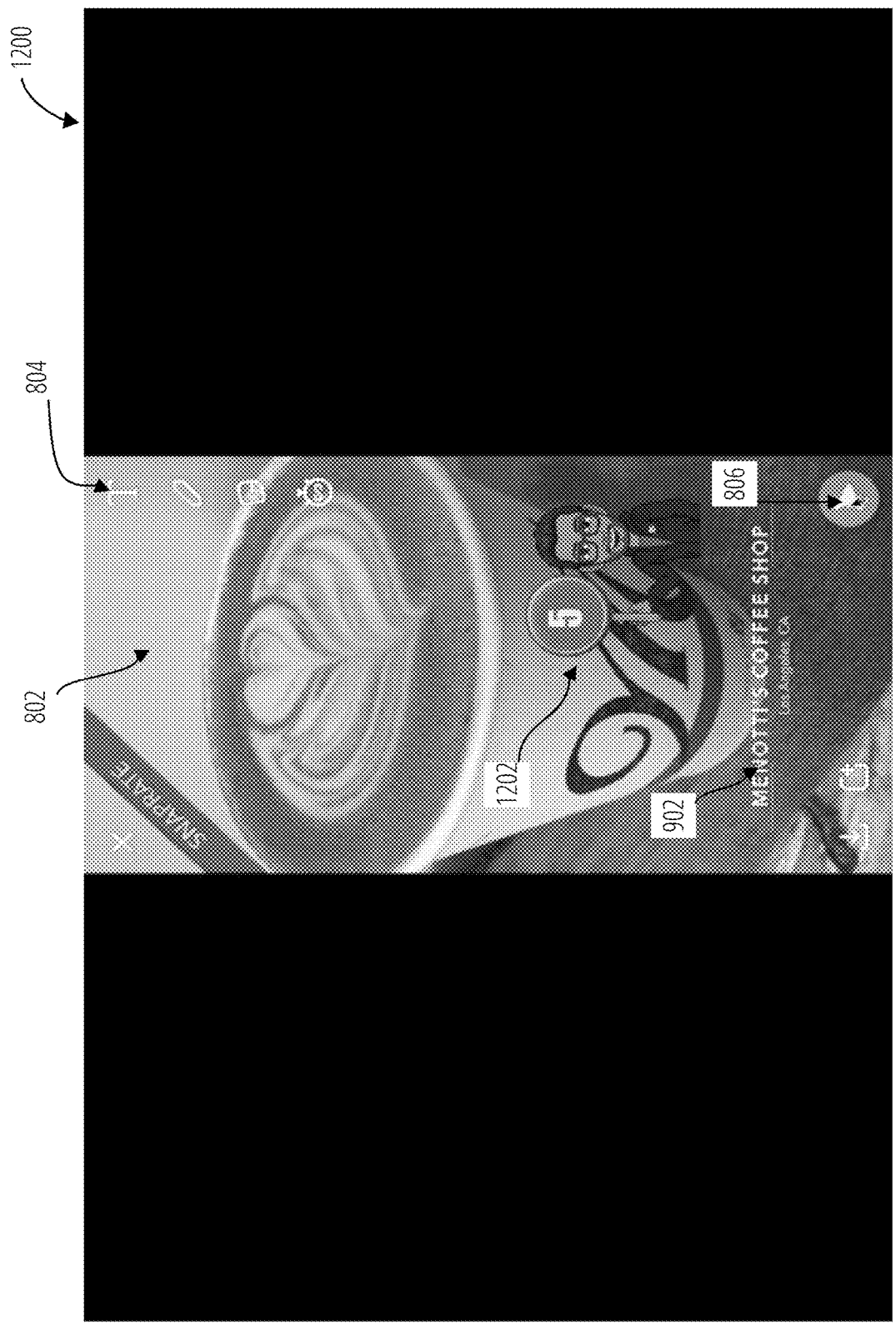
FIG. 12 illustrates a user interface 1200 in accordance with one embodiment.

FIG. 12 is a screenshot of a message generation user interface 1200, according to an example embodiment, showing a review annotation 1202, selected or generated using the review user interface 1100, presented as an overlay on, or annotation to, the image 802. Accordingly, the generated message content shown in FIG. 12 includes the image 802 itself, the geolocation annotation 902, and the review annotation 1202. Using the function icons 804, the messaging client application 104 also enables a user to annotate further and modify the image 802 and to thus create additional message content.

Figure 13:
FIG. 13 illustrates a user interface 1300 in accordance with one embodiment.

Having completed the creation of the message content, a user may then elect to communicate the composite, generated message content to one or more users of the messaging system 100. To this end, the messaging client application 104 may detect a user selection of the message send icon 806, which invokes an addressing user interface 1300, example of which is shown in FIG. 13. The addressing user interface 1300 presents a number of options to identify addressees or recipients of a message that includes the generated message content. Potential addressees or recipients presented within the addressing user interface 1300 include subscribers to particular threads or categories of content (e.g., "stories"), particular connections or "friends" within a social network (e.g., "best friends"), or recent recipients of messages. Within the groups of subscribers, one thread published all users of a particular social network (e.g., the "Our Story" thread), a subset of user of the social network to which the particular the is connected in the entity graph (e.g., "My Story"), a subset of users associated with a particular organization or entity (e.g., "Our Compass Story"), a subset of users associated with or following messages (e.g., posts) related to a particular venue (e.g., "The Canteen"), or a subset users belonging to a particular club (e.g., "Brunch Club"). The sending user may then identify the recipient, or group of recipients, to which the message will be sent (e.g., to which the post will be exposed).

Figure 14:
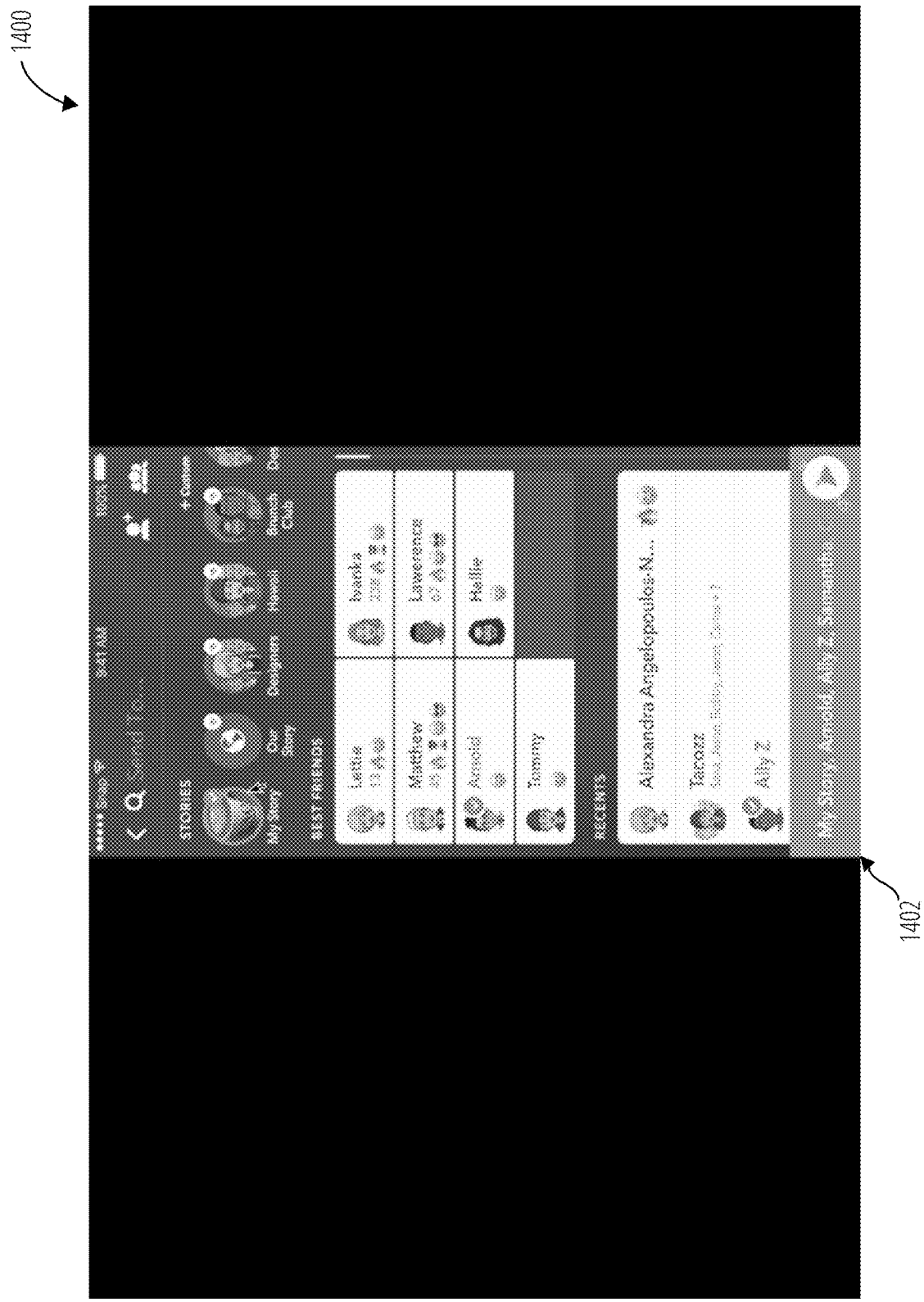
FIG. 14 illustrates a user interface 1400 in accordance with one embodiment.

FIG. 14 is a screenshot of an addressing user interface 1400, in which the selected recipients or addressees of message are identified in a recipient interface portion 1402, with the selected recipients also being identified by checkboxes in the user interface 1400.

Figure 15:
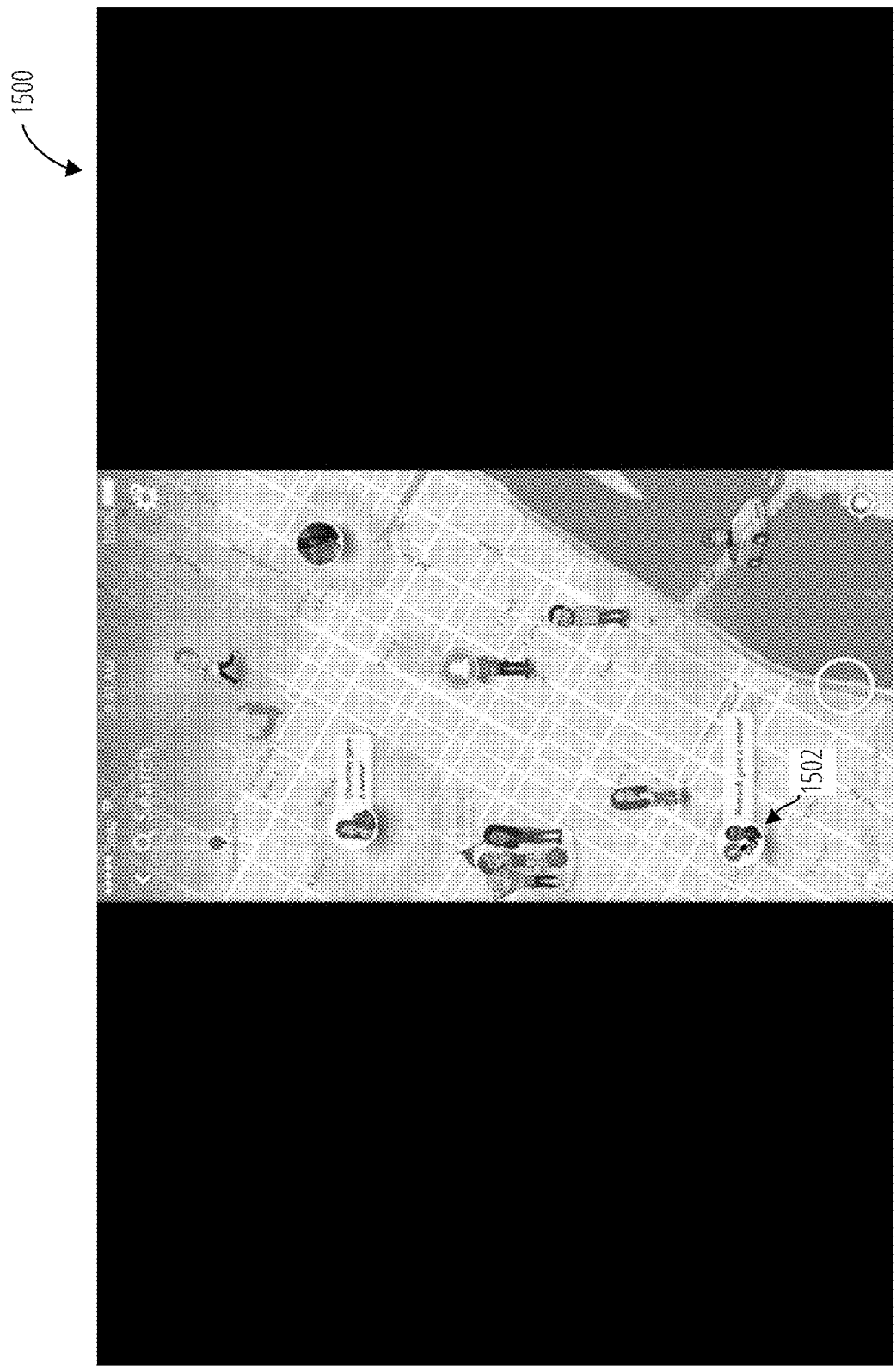
FIG. 15 illustrates a user interface 1500 in accordance with one embodiment.

The generated message content, including the review and social ranking information in the example form of a review annotation, may then be selectively exposed by the messaging system 100 to other users (e.g., the recipient selected as shown in FIG. 13 and FIG. 14). To this end, FIG. 15 shows a map user interface 1500, according to one example embodiment, in which review and/ranking information is selectively exposed and presented to a recipient user in association with points of interest on a map. The map shown in the user interface 1500 specifically shows that review information was posted by a particular user at a point of interest 1502 on the map. The review information is presented in the form of a review annotation, such as that described above, and accordingly provides information both regarding the identity of provider (or sender) of the review information (e.g., by the cartoon avatar representing the information provider), as well as the actual review information itself (e.g., the ranking information provided on paddle being held by the cartoon avatar). The review information also, as shown in FIG. 15, textually identifies the provider of the review information by name.

Figure 16:
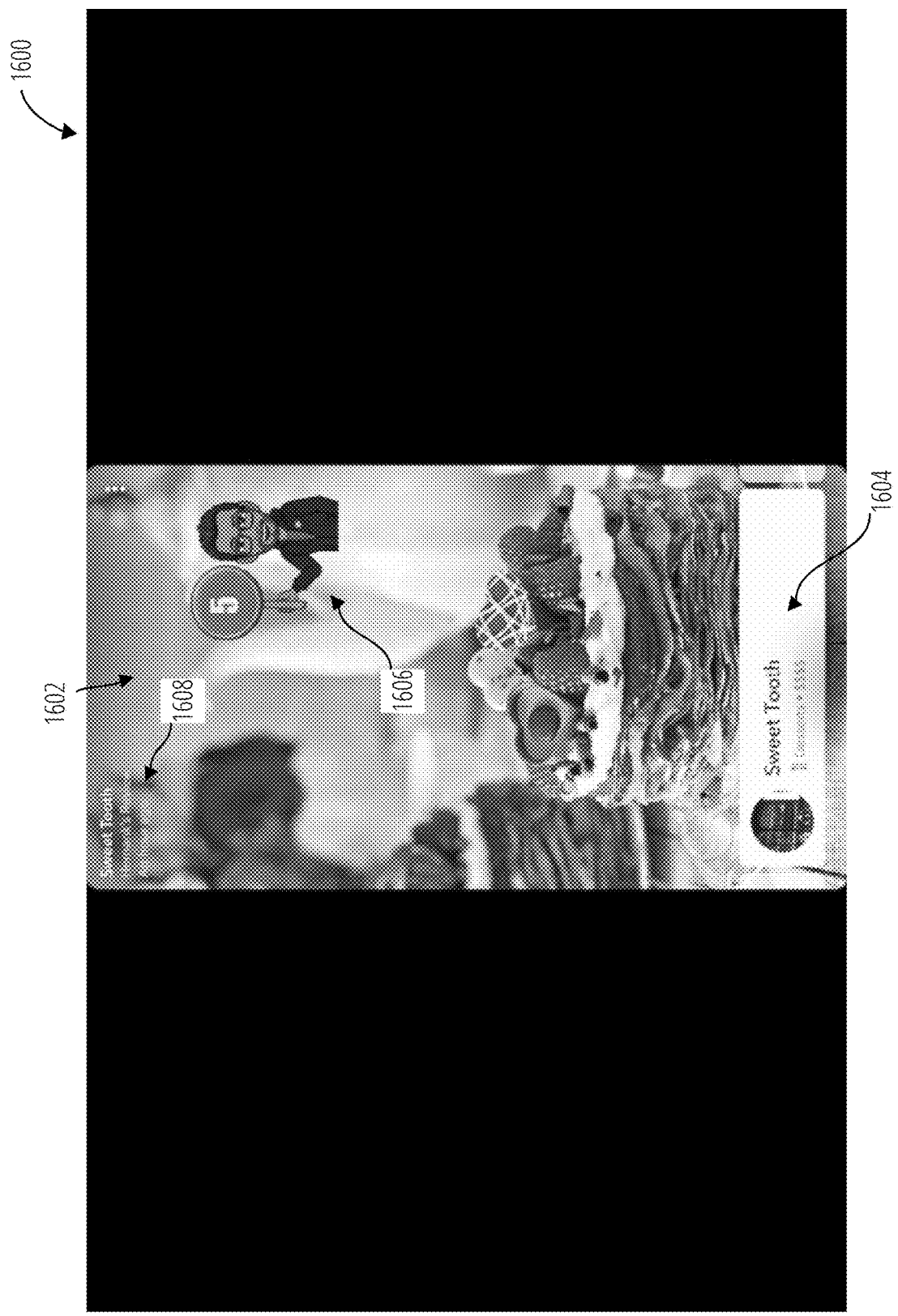
FIG. 16 illustrates a user interface 1600 in accordance with one embodiment.

The map shown within the user interface 1500 may be presented to a recipient user upon detecting that the recipient user is located within a determinable proximity of the point of interest (e.g., within a city in which the point of interest is located). A recipient user may then, on the map user interface 1500, select a presented review annotation associated with the point of interest to invoke the display of more detailed review information, as is shown in the review user interface 1600 of FIG. 16. The review user interface 1600 presents the composite, generated message content, including the review and ranking information, generated by the sending user. As shown in FIG. 16, an image 1602, a geolocation annotation 1604, and a review annotation 1606 may be presented within the review user interface 1600. Here, the image 1602 is of a particular confectionery that was photographed at example point of interest (e.g., Sweet Tooth) identified by the geolocation annotation 1604, with the review annotation 1606 indicating that the sending user ranked the confectionery 5 out of 5. It will also be noted that the review user interface 1600 provides a time indication 1608, indicating when the review information was posted (or how much time has passed since the review information posted).

Figure 17:
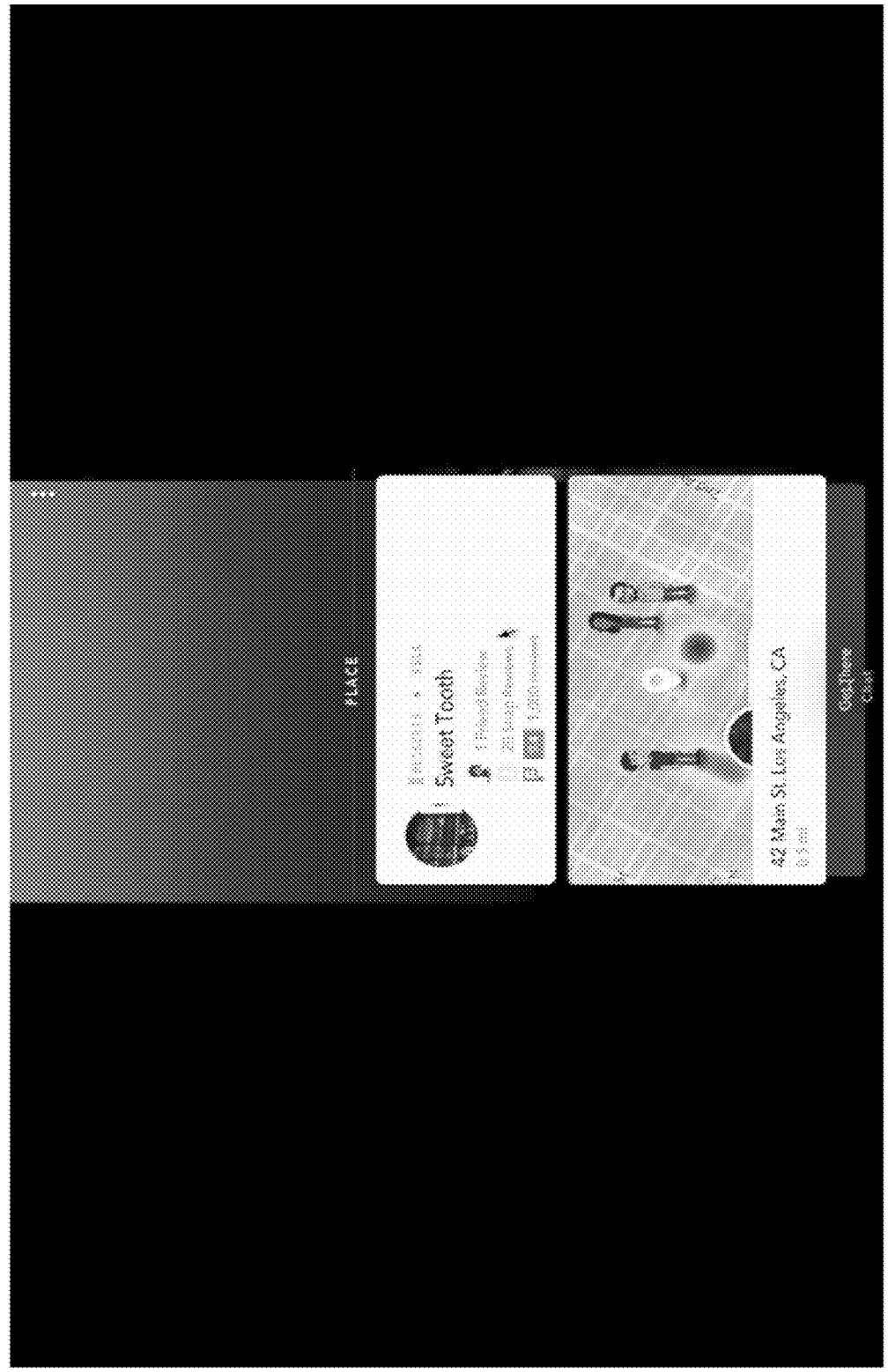
FIG. 17 illustrates a user interface 1700 in accordance with one embodiment.

FIG. 17 is a screenshot of a place detailed user interface 1700, showing further details regarding a particular point of interest, such as the number of reviews that social network connections (e.g., friends) of a viewing user have provided, the total number of reviews provided by users of the social network, and an overall ranking based on reviews from an external source. The user interface 1700 also provides an address of the point of interest, as well as the option to obtain directions from a current location to the point of interest.

Figure 18:
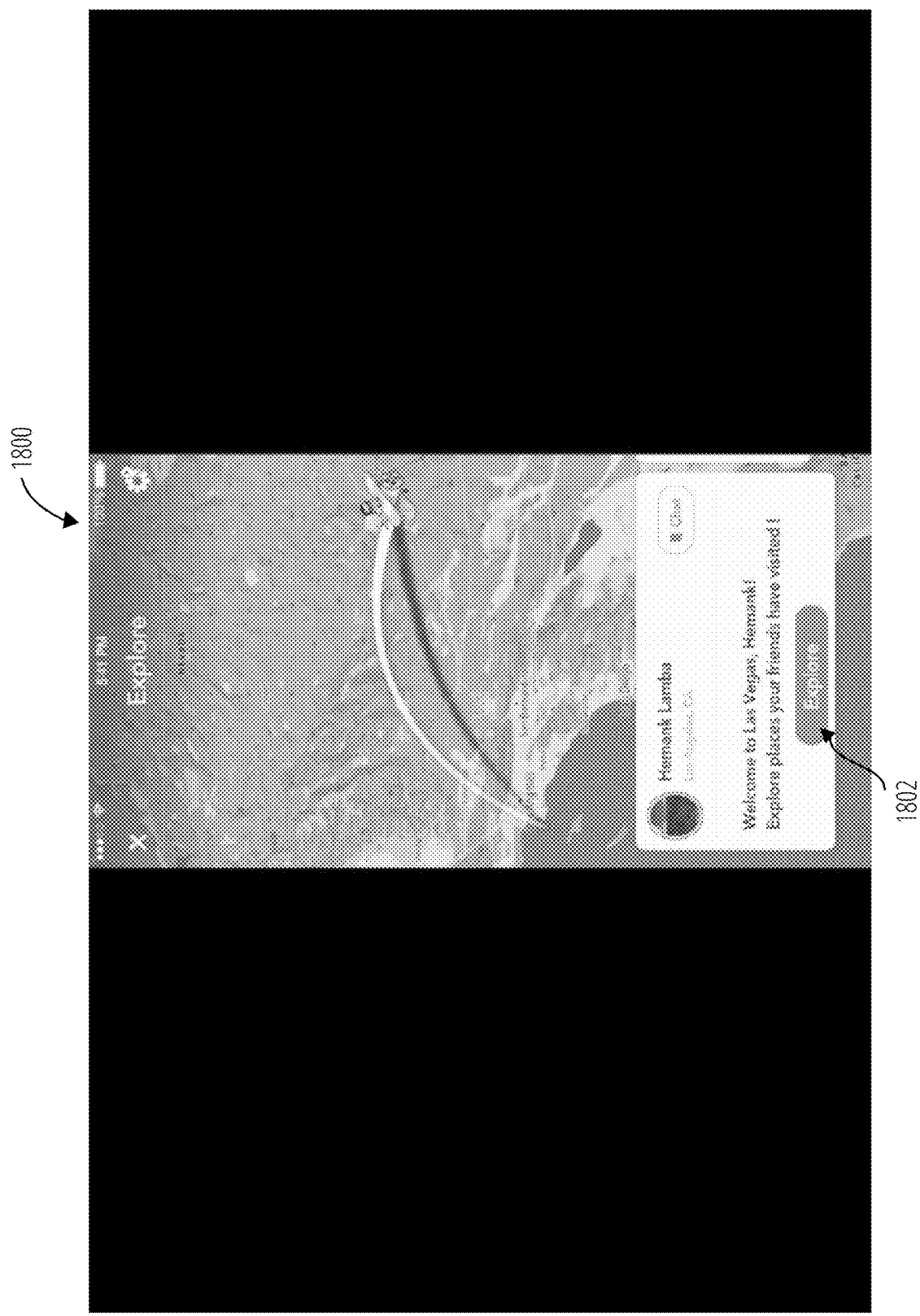
FIG. 18 illustrates a user interface 1800 in accordance with one embodiment.

FIG. 18 is a screenshot of a welcome user interface 1800 that is presented to a viewing user upon arrival within a geographic location or area (e.g., a city). The user interface 1800 invites the viewing user to explore points of interest (e.g., places) that social connections of the viewing user have visited and potentially rated within the geographic area. To this end, an explore button 1802 may be presented within a dialogue box of the user interface 1800.

Figure 19:
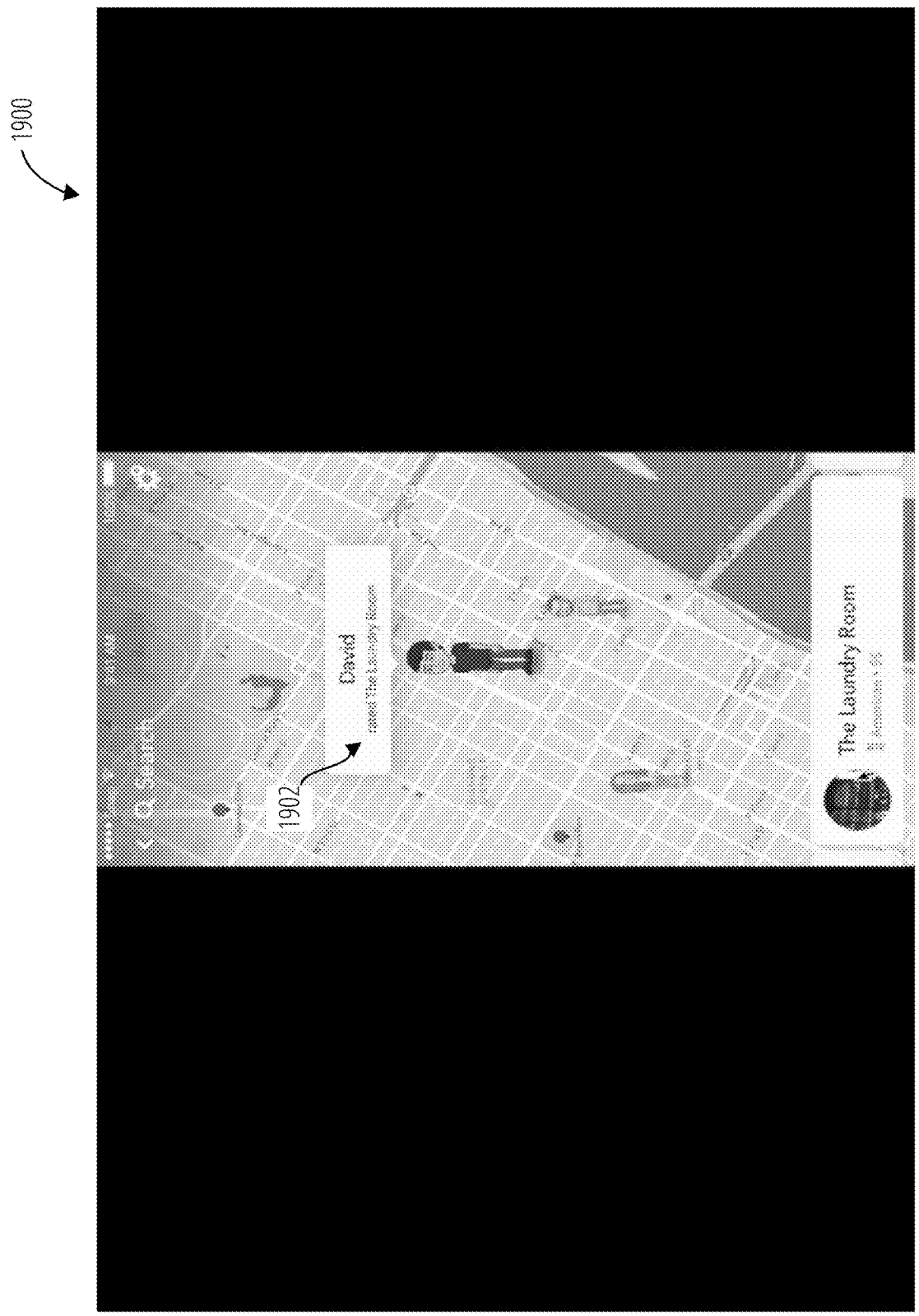
FIG. 19 illustrates a user interface 1900 in accordance with one embodiment.

FIG. 19 is a screenshot of an explore user interface 1900, according to an example embodiment, that may be presented by the messaging client application 104 responsive to user selection of the explore button 1802 within the user interface 1800. Specifically, the user interface 1900 shows a map of the geographic area, as well as character representations, in the form of cartoon avatars, at or adjacent points of interest within the geographic area that have been visited by the social connections of the viewing user. In addition, where a social connection has provided review and/or ranking information, the availability of this information is indicated in association with the cartoon avatar of the relevant user, as shown at item 1902.

It should be noted that the presentation of the cartoon avatars, and associated review and/or ranking information, at or adjacent point of interest may be time-limited, in that only current information is displayed (e.g., review and/or ranking information that has been posted within the last two weeks to 6 months).

In one embodiment, the sending user of the generated message content (including the review and/or ranking information) may indicate a time period within which this content for the viewable and presented to recipient users via a map interface, such as that within user interface 1900. The time limiting of the presentation of generated message content may be controlled by the timers described above.

Figure 20:
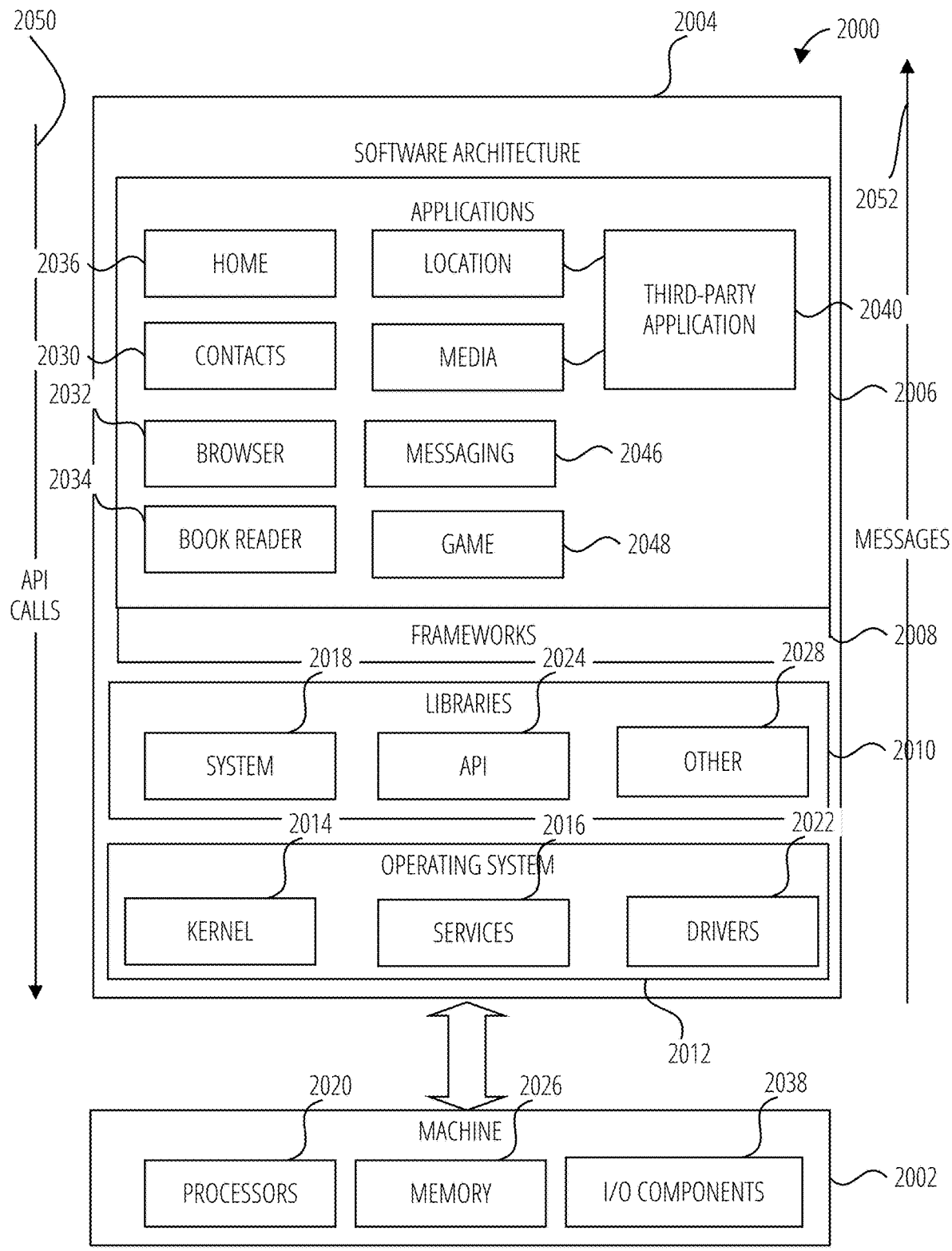
FIG. 20 is a block diagram showing a software architecture within which the present disclosure may be implemented, in accordance with some example embodiments.

FIG. 20 is a block diagram 2000 illustrating a software architecture 2004, which can be installed on any one or more of the devices described herein. The software architecture 2004 is supported by hardware such as a machine 2002 that includes processors 2020, memory 2026, and I/O components 2038. In this example, the software architecture 2004 can be conceptualized as a stack of layers, where each layer provides a particular functionality. The software architecture 2004 includes layers such as an operating system 2012, libraries 2010, frameworks 2008, and applications 2006. Operationally, the applications 2006 invoke API calls 2050 through the software stack and receive messages 2052 in response to the API calls 2050.

The operating system 2012 manages hardware resources and provides common services. The operating system 2012 includes, for example, a kernel 2014, services 2016, and drivers 2022. The kernel 2014 acts as an abstraction layer between the hardware and the other software layers. For example, the kernel 2014 provides memory management, processor management (e.g., scheduling), component management, networking, and security settings, among other functionality. The services 2016 can provide other common services for the other software layers. The drivers 2022 are responsible for controlling or interfacing with the underlying hardware. For instance, the drivers 2022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 2010 provide a low-level common infrastructure used by the applications 2006. The libraries 2010 can include system libraries 2018 (e.g., C standard library) that provide functions such as memory allocation functions, string manipulation functions, mathematic functions, and the like. In addition, the libraries 2010 can include API libraries 2024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2010 can also include a wide variety of other libraries 2028 to provide many other APIs to the applications 2006.

The frameworks 2008 provide a high-level common infrastructure that is used by the applications 2006. For example, the frameworks 2008 provide various graphical user interface (GUI) functions, high-level resource management, and high-level location services. The frameworks 2008 can provide a broad spectrum of other APIs that can be used by the applications 2006, some of which may be specific to a particular operating system or platform.

In an example embodiment, the applications 2006 may include a home application 2036, a contacts application 2030, a browser application 2032, a book reader application 2034, a location application 2042, a media application 2044, a messaging application 2046, a game application 2048, and a broad assortment of other applications such as a third-party application 2040. The e applications 2006 are programs that execute functions defined in the programs. Various programming languages can be employed to create one or more of the applications 2006, structured in a variety of manners, such as object-oriented programming languages (e.g., Objective-C, Java, or C++) or procedural programming languages (e.g., C or assembly language). In a specific example, the third-party application 2040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2040 can invoke the API calls 2050 provided by the operating system 2012 to facilitate functionality described herein.

Figure 21:
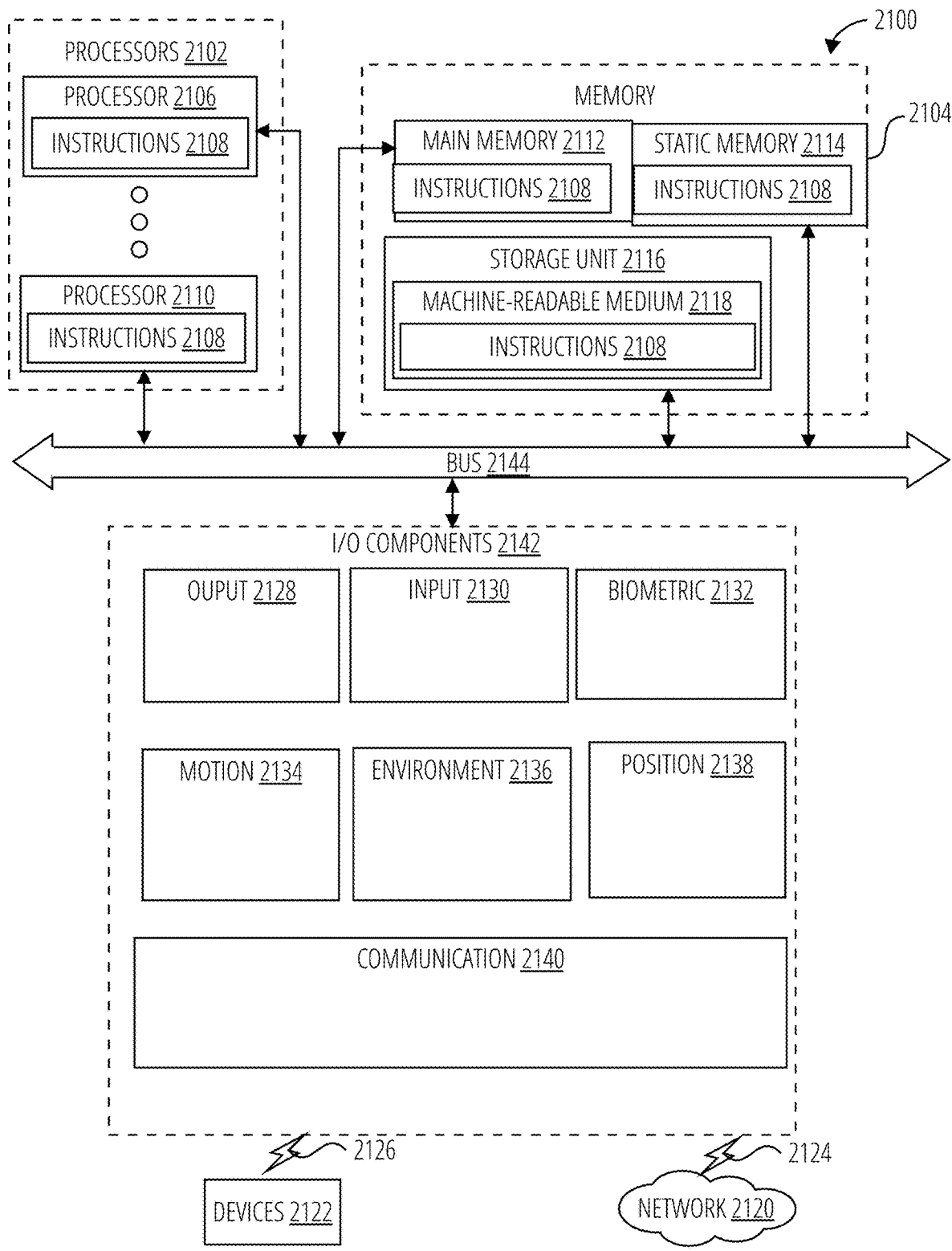
FIG. 21 is a diagrammatic representation of a machine in the form of a computer system within which a set of instructions may be executed for causing the machine to perform any one or more of the methodologies discussed herein, in accordance with some example embodiments.

FIG. 21 is a diagrammatic representation of the machine 2100 within which instructions 2108 (e.g., software, a program, an application, an applet, an app, or other executable code) for causing the machine 2100 to perform any one or more of the methodologies discussed herein may be executed. For example, the instructions 2108 may cause the machine 2100 to execute any one or more of the methods described herein. The instructions 2108 transform the general, non-programmed machine 2100 into a particular machine 2100 programmed to carry out the described and illustrated functions in the manner described. The machine 2100 may operate as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2108, sequentially or otherwise, that specify actions to be taken by the machine 2100. Further, while only a single machine 2100 is illustrated, the term "machine" shall also be taken to include a collection of machines that individually or jointly execute the instructions 2108 to perform any one or more of the methodologies discussed herein.

The machine 2100 may include processors 2102, memory 2104, and I/O components 2142, which may be configured to communicate with each other via a bus 2144. In an example embodiment, the processors 2102 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2106 and a processor 2110 that execute the instructions 2108. The term "processor" is intended to include multi-core processors that may comprise two or more independent processors (sometimes referred to as "cores") that may execute instructions contemporaneously. Although FIG. 21 shows multiple processors 2102, the machine 2100 may include a single processor with a single core, a single processor with multiple cores (e.g., a multi-core processor), multiple processors with a single core, multiple processors with multiples cores, or any combination thereof.

The memory 2104 includes a main memory 2112, a static memory 2114, and a storage unit 2116, both accessible to the processors 2102 via the bus 2144. The main memory 2104, the static memory 2114, and storage unit 2116 store the instructions 2108 embodying any one or more of the methodologies or functions described herein. The instructions 2108 may also reside, completely or partially, within the main memory 2112, within the static memory 2114, within machine-readable medium 2118 within the storage unit 2116, within at least one of the processors 2102 (e.g., within the processor's cache memory), or any suitable combination thereof, during execution thereof by the machine 2100.

The I/O components 2142 may include a wide variety of components to receive input, provide output, produce output, transmit information, exchange information, capture measurements, and so on. The specific I/O components 2142 that are included in a particular machine will depend on the type of machine. For example, portable machines such as mobile phones may include a touch input device or other such input mechanisms, while a headless server machine will likely not include such a touch input device. It will be appreciated that the I/O components 2142 may include many other components that are not shown in FIG. 21. In various example embodiments, the I/O components 2142 may include output components 2128 and input components 2130. The output components 2128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2142 may include biometric components 2132, motion components 2134, environmental components 2136, or position components 2138, among a wide array of other components. For example, the biometric components 2132 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2134 include acceleration sensor components (e.g., accelerometer), gravitation sensor components, rotation sensor components (e.g., gyroscope), and so forth. The environmental components 2136 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2138 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2142 further include communication components 2140 operable to couple the machine 2100 to a network 2120 or devices 2122 via a coupling 2124 and a coupling 2126, respectively. For example, the communication components 2140 may include a network interface component or another suitable device to interface with the network 2120. In further examples, the communication components 2140 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 2122 may be another machine or any of a wide variety of peripheral devices (e.g., a peripheral device coupled via a USB).

Moreover, the communication components 2140 may detect identifiers or include components operable to detect identifiers. For example, the communication components 2140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2140, such as location via Internet Protocol (IP) geolocation, location via Wi-Fi® signal triangulation, location via detecting an NFC beacon signal that may indicate a particular location, and so forth.

The various memories (e.g., memory 2104, main memory 2112, static memory 2114, and/or memory of the processors 2102) and/or storage unit 2116 may store one or more sets of instructions and data structures (e.g., software) embodying or used by any one or more of the methodologies or functions described herein. These instructions (e.g., the instructions 2108), when executed by processors 2102, cause various operations to implement the disclosed embodiments.

The instructions 2108 may be transmitted or received over the network 2120, using a transmission medium, via a network interface device (e.g., a network interface component included in the communication components 2140) and using any one of a number of well-known transfer protocols (e.g., hypertext transfer protocol (HTTP)). Similarly, the instructions 2108 may be transmitted or received using a transmission medium via the coupling 2126 (e.g., a peer-to-peer coupling) to the devices 2122.

The above-described example embodiments provide a number of technical advantages and advancements, in that review and ranking information may be selectively associated with user-generated content (e.g., such as images and audio data) by a user using a client application executing on a client device. The ability to selectively associated the review or ranking information with the generated content is furthermore enabled or disabled based on some degree of verification that the user device is or has been located at a point of interest to which the review and ranking information pertains, or the user-generated content was created captured within a determinable proximity of the point of interest. This verification, which may be performed using the geolocation information associated with the point of interest and user device (or user-generated content), may operate to counter misleading or inaccurate reviews, provided by users that may not, in fact, have visited the point of interest. Furthermore, the time limiting of the presentation of ranking and review information may serve to reduce that are within a user interface, and accordingly, make user navigation of an interface which this nation is presented easier.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method to communicate a message, the method comprising:
 producing user-generated content in association with a client application, the user-generated content being captured using a camera of a user device;
 determining, based on the user-generated content, geolocation information indicating a geographic location;

causing, using one or more visual components of the user device, display of a first user interface that includes the user-generated content, detecting user input with respect to the first user interface to activate review functionality of the client application;

causing, using the one or more visual components of the user device and responsive to the user input, display of a second user interface that includes:

the user-generated content;

a geolocation annotation indicating a point of interest related to the geographic location, the geolocation annotation being presented as an overlay on the user-generated content, and being selectable to provide a review related to the user-generated content; and a review indication indicating that review functionality of the client application is active;

detecting user interaction with the geolocation annotation;

responsive to the user interaction with the geolocation annotation, causing, using the one or more visual components, display of a third user interface, that includes a plurality of review annotations;

generating, based on additional user interaction to modify a review annotation of the plurality of review annotations, a modified review annotation;

generating message content associated with the point of interest, the message content being displayed in a fourth user interface that includes the user-generated content, the geolocation annotation, and the modified review annotation; and generating a map interface that indicates the point of interest, that indicates review information is available for one or more points of interest, and that includes a plurality of icons, the plurality of icons including a first set of icons having a first shape that correspond to a number of locations included in the map interface and a second set of icons having a second shape that correspond to high volume areas included in the map interface.

2. The method of claim 1, wherein the first user interface includes a plurality of function icons, each function icon of the plurality of function icons being selectable to annotate the user-generated content.

3. The method of claim 1, wherein the review annotation is selectable to indicate one or more rankings of the point of interest;

the additional user interaction corresponds to selection of a ranking of the one or more rankings; and the modified review annotation indicates the ranking.

4. The method of claim 3, wherein the modified review annotation includes an avatar representing a user of the user device.

5. The method of claim 1, wherein individual review annotations of the plurality of review annotations correspond to a distinct rating of the point of interest.

6. The method of claim 1, wherein:

the user input with respect to the first user interface to activate review functionality of the client application is a swipe right input.

7. The method of claim 1, wherein the user device corresponds to a first user of the client application, and the method comprises:

receiving a request from a second user of the client application to access the map interface;

determining that the second user is a recipient of the message content;

generating the map interface in response to the request from the second user;

determining that the second user is within a distance of the point of interest; and causing, based on the second user being within the distance of the point of interest, the review annotation related to the point of interest to be displayed in the map interface in conjunction with the point of interest.

8. The method of claim 1, comprising:

causing display of a number of time window parameter settings, individual time window parameter settings corresponding to a time period;

receiving additional input to select a time window parameter setting of the number of time window parameter settings; and determining, based on the time window parameter setting, review information to display to a user of the user device within the client application, the review information including one or more additional review annotations provided by one or more additional users of the client application with respect to one or more points of interest.

9. The method of claim 1, comprising:

causing display of a number of user parameter settings, individual user parameter settings corresponding to a degree of connection in an entity graph of a user of the client application that indicates a social network of the user within the client application;

receiving additional input to select a user parameter setting of the number of user parameter settings; and determining, based on the user parameter setting, review information to display to the user within the client application, the review information including one or more additional review annotations provided by one or more additional users of the client application that correspond to the degree of connection of the user parameter setting selected by the user.

10. The method of claim 1, comprising:

generating a fifth user interface that includes options for recipients of the message content, the options including connections within a social network of a user of the client application and a number of users of the client application that are related to one or more venues.

11. A computing apparatus, the computing apparatus comprising:

a processor; and a memory storing instructions that, when executed by the processor, configure the computing apparatus to:

produce user-generated content in association with a client application, the user-generated content being captured using a camera of a user device;

determine, based on the user-generated content, geolocation information indicating a geographic location;

cause, using one or more visual components of the user device, display of a first user interface that includes the user-generated content, detect user input with respect to the first user interface to activate review functionality of the client application;

cause, using the one or more visual components of the user device and responsive to the user input, display of a second user interface that includes:

the user-generated content;

a geolocation annotation indicating a point of interest related to the geographic location, the geolocation annotation being presented as an overlay on the

33 user-generated content, and being selectable to provide a review related to the user-generated content; and
a review indication indicating that review functionality of the client application is active;
detect user interaction with the geolocation annotation;
responsive to the user interaction with the geolocation annotation, cause, using the one or more visual components, display of a third user interface that includes a plurality of review annotations;
generate, based on additional user interaction to modify a review annotation of the plurality of review annotations, a modified review annotation;
generate message content associated with the point of interest, the message content being displayed in a fourth user interface that includes the user-generated content, the geolocation annotation, and the modified review annotation; and
generate a map interface that indicates the point of interest, that indicates review information is available for one or more points of interest, and that includes a plurality of icons, the plurality of icons including a first set of icons having a first shape that correspond to a number of locations included in the map interface and a second set of icons having a second shape that correspond to high volume areas included in the map interface.

12. The computing apparatus of claim 11, wherein the memory stores additional instructions that, when executed by the processor, configure the computing apparatus to:
determine, using the geolocation information, that the user device is currently within a determinable proximity of the point of interest; and
based on the user device currently being within the determinable proximity of the point of interest, selectively enable the user-generated content associated with the point of interest to be generated.

13. The computing apparatus of claim 11, wherein the memory stores additional instructions that, when executed by the processor, configure the computing apparatus to:
determine, using the geolocation information, that the user device has been within a determinable proximity of the point of interest within a defined time period; and
based on the user device being within the determinable proximity of the point of interest within the defined time period, selectively enable the user-generated content associated with the point of interest to be generated.

14. The computing apparatus of claim 11, wherein the memory stores additional instructions that, when executed by the processor, configure the computing apparatus to:
generate a set of additional user-generated content that corresponds to the point of interest using image recognition technology and a set of content rules; and
cause the set of additional user-generated content to be accessible to users of the client application within a determinable proximity of the point of interest.

15. The computing apparatus of claim 11, wherein the memory stores additional instructions that, when executed by the processor, configure the computing apparatus to:
receive a request from a second user of the client application to access the map interface; and
generate the map interface in response to the request from the second user, the map interface including an indicator that corresponds to the modified review annotation.

34

16. The computing apparatus of claim 15, wherein the memory stores additional instructions that, when executed by the processor, configure the computing apparatus to:
receive input indicating selection of the indicator included in the map interface that corresponds to the modified review annotation; and
cause display of a review user interface that includes the message content and a time indication that corresponds to a time that the message content was generated.

17. The computing apparatus of claim 11, wherein the memory stores additional instructions that, when executed by the processor, configure the computing apparatus to:
cause display of an additional user interface that corresponds to the point of interest, the additional user interface indicating reviews related to the point of interest provided by social network connections of a user of the user device.

18. One or more non-transitory computer-readable storage media, the one or more non-transitory computer-readable storage media including instructions that, when executed by a computer, cause the computer to:
produce user-generated content in association with a client application, the user-generated content being captured using a camera of a user device;
determine, based on the user-generated content, geolocation information indicating a geographic location;
cause, using one or more visual components of the user device, display of a first user interface that includes the user-generated content, detect user input with respect to the first user interface to activate review functionality of the client application;
cause, using the one or more visual components of the user device and responsive to the user input, display of a second user interface that includes:
the user-generated content;
a geolocation annotation indicating a point of interest related to the geographic location, the geolocation annotation being presented as an overlay on the user-generated content, and being selectable to provide a review related to the user-generated content; and
a review indication indicating that review functionality of the client application is active;
detect user interaction with the geolocation annotation;
responsive to the user interaction with the geolocation annotation, cause, using the one or more visual components, display of a third user interface that includes a plurality of review annotations;
generate, based on additional user interaction to modify a review annotation of the plurality of review annotations, a modified review annotation;
generate message content associated with the point of interest, the message content being displayed in a fourth user interface that includes the user-generated content, the geolocation annotation, and the modified review annotation; and
generate a map interface that indicates the point of interest, that indicates review information is available for one or more points of interest, and that includes a plurality of icons, the plurality of icons including a first set of icons having a first shape that correspond to a number of locations included in the map interface and a second set of icons having a second shape that correspond to high volume areas included in the map interface.

19. The one or more non-transitory computer-readable storage media of claim 18, wherein the fourth user interface includes an option that is selectable to identify one or more recipients of the message content, and the one or more non-transitory computer-readable storage media include additional instructions that, when executed by the computer, cause the computer to:

generate a fifth user interface that includes options for recipients of the message content, the options including connections within a social network of a user of the client application and a number of additional users of the client application that are related to one or more venues.

20. The one or more non-transitory computer-readable storage media of claim 19, wherein the one or more non-transitory computer-readable storage media include additional instructions that, when executed by the computer, cause the computer to:

receive input to select one or more options displayed in the fifth user interface to indicate one or more recipients of the message content;

receive additional input to send the message content to the one or more recipients; and cause the message content to be accessible to the one or more recipients within the client application.

* * * * *